United States Patent [19]

Spath et al.

[11] Patent Number: 5,320,016
[45] Date of Patent: Jun. 14, 1994

[54] VERTICAL BAND SAW

[75] Inventors: Dieter Spath, Sasbachwalden; Armin Stolzer, Renchen, both of Fed. Rep. of Germany

[73] Assignee: Keuro Besitz GmbH & Co. EDV-Dienstleistungs KG., Achern, Fed. Rep. of Germany

[21] Appl. No.: 648,215

[22] Filed: Jan. 31, 1991

[30] Foreign Application Priority Data

Feb. 17, 1990 [DE] Fed. Rep. of Germany ....... 4005143

[51] Int. Cl.⁵ ................ B23D 53/04; B23D 55/04; B27B 13/04
[52] U.S. Cl. .................................. 83/801; 83/794; 83/810; 83/811
[58] Field of Search ............ 83/788, 794–798, 83/801, 802, 809–812

[56] References Cited

U.S. PATENT DOCUMENTS

| | | | |
|---|---|---|---|
| 1,152,696 | 9/1915 | Berry | 83/794 |
| 1,280,341 | 10/1918 | Wardman | 83/801 |
| 1,381,418 | 6/1921 | Hunter | 83/794 |
| 2,551,268 | 5/1951 | Hoffman | 83/794 |
| 2,705,510 | 4/1955 | Stocke | 83/811 |
| 2,774,131 | 12/1956 | Crane | 29/68 |
| 2,855,043 | 10/1958 | Opferkuch . | |
| 2,928,439 | 3/1960 | Tester | 83/812 |
| 3,254,684 | 6/1966 | Hawkins | 83/801 |
| 3,556,177 | 1/1971 | Cleland | 83/201 |
| 4,027,566 | 6/1977 | Harrill | 83/411 R |
| 4,653,371 | 3/1987 | Vancalbergh | 83/464 |
| 4,658,689 | 4/1987 | Yakich | 83/812 |
| 4,713,994 | 12/1987 | Guglielmetti | 83/71 |
| 4,909,108 | 3/1990 | Nakada et al. | 83/812 |
| 4,922,777 | 5/1990 | Kawabata | 82/810 |

FOREIGN PATENT DOCUMENTS

| | | | |
|---|---|---|---|
| 562543 | 5/1958 | Belgium . | |
| 1162064 | 1/1964 | Fed. Rep. of Germany | 83/788 |
| 1777234 | 8/1971 | Fed. Rep. of Germany . | |
| 2320444 | 10/1974 | Fed. Rep. of Germany | 83/811 |
| 2405992 | 4/1975 | Fed. Rep. of Germany . | |
| 3409731 | 8/1985 | Fed. Rep. of Germany . | |
| 3537298 | 9/1987 | Fed. Rep. of Germany . | |
| 3710515 | 6/1988 | Fed. Rep. of Germany . | |
| 3710515 | 6/1988 | Fed. Rep. of Germany . | |
| 2098715 | 3/1972 | France . | |
| 0106728 | 8/1980 | Japan | 83/811 |
| 1088892 | 10/1967 | United Kingdom . | |
| 1353946 | 5/1974 | United Kingdom . | |
| 2129367 | 5/1984 | United Kingdom . | |

Primary Examiner—Hien H. Phan
Attorney, Agent, or Firm—Frishauf, Holtz, Goodman & Woodward

[57] ABSTRACT

To permit miter cuts clear through a workpiece, or for selected depths, a saw band carrier (6) supports a pair of saw band wheels (7, 8) above and below a workpiece support (2), and the saw band wheel carrier (6) is pivotable about a substantially vertical axis of rotation (29). The axis of rotation (29) is preferably located at the initial cutting engagement point of an endless saw band (9) looped about the saw band wheels (7, 8), and the pivoting position can be arrested at any desired pivoted or angular position. In addition, the saw band carrier can be arranged to tilt about an essentially horizontal tilt axis.

36 Claims, 18 Drawing Sheets

VERTICAL BAND SAW

FIELD OF THE INVENTION

The invention relates to a versatile band saw having an endless saw band circulating over running wheels and further running through guides to guide the saw band into a cutting plane, and more particularly to such a saw which is of simple construction and with which miter (or miter) cuts can easily be made.

BACKGROUND

In known vertical band saws of this kind the axes of rotation of the runner wheels preferably have an inclination of 45° in relation to the cutting plane, to which there should however be no limitation. Furthermore, as a rule clamping means for the material are provided, which for the secure retention of the material are arranged preferably on both sides of the cutting plane.

The known vertical band saws enable the material to be sawn to be severed in an arrangement of the cutting plane normal to the direction of feed of the material. Miter cuts, in which the cutting plane is pivoted in relation to the feed direction of the material, are not, however, possible in this case.

Known vertical band saws with a work bench of the machine frame not provided with clamping means do permit freehand sawing to a certain extent wherein the material piece to be machined is fed by hand at an appropriate angle to the cutting plane formed by the saw band.

In order to produce miter cuts, cold circular saws are used in which the saw blade and thus the cutting plane can be pivoted to the miter angle. Such cold circular saws have, however, the disadvantages that the material cross-section is limited by the size of the radius of the saw blade in relation to the possibilities of a vertical band saw of the stated kind, and that a circular saw blade has an arcuate rather than straight-line cutting course so that there is no possibility of producing rectilinear incisions, i.e. straight cuts which do not completely sever the material.

Cold circular saws are, incidentally, in no way suitable for freehand machining or cutting of workpiece material in the manner described above. Freehand sawing with circular saws is extremely hazardous.

THE INVENTION

It is an object of the invention to provide a vertical band saw which, in addition to the execution of straight cuts, also enables miter cuts to be made, and moreover with positive and negative miter angles in relation to the feed direction of the material. Interruption of the cutting operation, that is, the execution of partial cuts with rectilinear cutting course, should be rendered possible. The vertical band saw is to possess a compact, simple structure, an especially light construction in relation to the cutting capacity and, finally, an especially easily handled arrangement of the parts connected with the sawing action, while on the other hand, however, the capabilities of a vertical band saw should be preserved, especially with regard to the freehand sawing as set forth above.

Briefly, the wheel carrier is so secured in the machine that it is pivotable about a substantially vertical pivot axis and can be made fast or arrested in any pivoted position.

By this measure in accordance with the invention, it is possible for the wheel carrier and thus the cutting plane to be adjusted to different miter angles—in relation to the feed direction of the material to be sawed—without a shift in that case of the center of gravity of the wheel carrier and the occurrence of statical and guidance problems connected therewith, because independently of the setting of different miter angles the wheel carrier remains always static in its original position of vertical equilibrium, which is important especially also for the development of feed guides of the wheel carrier.

The setting, in accordance with the invention, of different miter angles, combined with orientation of the cutting direction perpendicular to the feed direction of the material, has in fact the consequence that now, at these miter angles, the commencement of sawing of the material takes place obliquely to its surface line, which hitherto has been avoided as a matter of fundamentals because of the fear of foul cuts. However, it has now appeared that such an oblique start of the cut is entirely possible and leads to good results.

As a result of the elimination of weight shift problems in connection with the miter setting of the wheel carrier, the possibility now also exists of forming the wheel carrier in a light constructional manner as a compact unit which contains all the components necessary for the operation of the saw band, such components being, above all, the drive motor flanged to the wheel carrier, the guides for reversal of the saw band, the control and adjustment systems of the cutting conditions including the handling means necessary for that purpose, etc. Thus the vertical band saw can be developed essentially as a constructional unit formed from the wheel carrier including all parts necessary for the sawing operation. This constructional unit may be pivotable as a whole about the vertical axis of rotation and advanceable in relation to the machine frame and the material without causing thereby any kind of static problems dependent on the actual setting of the miter angle. Expressed differently, the invention results in a band saw machine equipped with all essential parts and assembled in the wheel carrier, which can be freely handled in relation to the machine frame and thus the workpiece mounting, both as regards the feed motion in the direction of the workpiece material and in relation to differently set miter angles.

Due to the stated conditions produced by the invention the wheel carrier may, however, also be made light and simple in its construction, which likewise includes the guidance and mounting of the wheel carrier in relation to the machine frame.

Attendant on these factors is that the light handling and movement of the wheel carrier, requiring only a slight expenditure of force, correspondingly requires only relatively small-sized setting and guidance means.

It has proved expedient to arrange the axis of rotation vertically. If then the axis of rotation passes through the point of the start of the cut, it practically forms the line of penetration, which results from the cutting plane for the one part and the vertical plane of abutment on the material on the sides of the wheel carrier. This has the advantage that the point of commencement of cutting of the saw band in relation to the workpiece material does not change due to the varying setting of a miter angle, so that in this connection also no correction values need to be taken into account in connection with the setting of length of the workpiece material.

For the handling of the vertical band saw in accordance with the invention, the material can be movable in the cutting direction towards the saw band, this being realisable e.g. by a horizontally movable carriage for the reception of the workpiece material. Then the material is moved in the cutting direction towards the saw band by hand or equally by a corresponding movement guided in another manner.

The basically different possibility consists in that for the feed of the saw band the wheel carrier can be advanced in the direction towards the material, and thus in the cutting direction, by feed means. This inherently usual procedure permits a stationary securing of the material, whereupon by means of corresponding movement of the wheel carrier the saw band is moved in the cutting direction through the material. For both cases mentioned above the mounting for the material may be a machine bench displaceable in the cutting direction and having a substantially horizontal carrier surface, and the machine bench may be formed by or arranged on the machine frame.

The machine bench may then be a turntable pivotable with the wheel carrier and the pivot axis of the turntable may be arranged to coincide with the axis of rotation of the wheel carrier.

For the reception of the material to be sawn, expediently this mounting comprises a stationary abutment bridge with a substantially vertical clamping face for the material, on the side of the material facing the wheel carrier and on at least one side of the cutting plane of the saw band. In this way, the material can be positioned in a defined manner parallel to its longitudinal extent, in order then either to be fed to the sawing cut by movement of the material mounting in the direction towards the saw band and parallel to the cutting direction, or in order to permit the cutting feed of the wheel carrier and thus of the saw band in a form where the material is situated in a defined position predetermined by the abutment bridge.

Along the lines of what is said further above, expediently here the axis of rotation of the wheel carrier is situated in the plane of the clamping face of the abutment bridge. Thus the clamping face is the vertical plane of abutment on the workpiece material in which the axis of rotation of the wheel carrier lies so that, irrespective of the setting in each case of a pivotal position of the wheel carrier, the point of start of the cut between the saw band and the material always remains the same and consequently necessitates no correction in dependence upon the set miter angle.

Advantageously for the further development of the fixed clamping of the material during the cutting operation the abutment bridge is arranged opposite to an openable and closable clamping jaw, clamping the material horizontally against at least the clamping face of the abutment bridge and likewise having a substantially vertical clamping face. Thus, the material can be clamped by this clamping jaw against the clamping face of the abutment bridge.

Within this framework, however, the clamping face may also be inclined to the vertical, proceeding away from the saw band in the cutting direction. Such an embodiment permits a wedging action, generated by the cutting force exerted by the saw band, between material and clamping jaw or the clamping face thereof, which action additionally serves for the non-shiftable retention of the material during the cutting action.

In order, with regard to the clamping jaw, to leave sufficient freedom of movement for the saw band transversely of the cutting plane, for reasons which may be seen further below, expediently the clamping jaw comprises on the side facing the saw band an optionally replaceable material for easy incision by the saw band so that in this way the saw band encounters no obstacle to the complete penetration of the material, even in the case of a slightly oblique positioning of the saw band in the clamping jaw.

Alternatively to the above, it can be provided that at least one openable and closable clamping jaw clamping the material vertically against the machine bench is provided beside the cutting plane, in association with the abutment bridge. Such a vertical clamping jaw, which may for example, be combined as a component with the abutment bridge, gives another possibility especially with regard to workpiece materials of complicated surface which may be poorly graspable with a horizontal clamping jaw.

Of course, in the vertical band saw in accordance with the invention both the horizontal clamping jaw and the vertical clamping jaw can be provided in common, in order to come into use either alternatively or in combination.

Furthermore, expediently the saw band guide arranged beneath the material region is made fast on the wheel carrier and the saw band guide arranged above the material region is made adjustable and securable in the running direction of the saw band on the wheel carrier. Thus both saw band guides may be components of the wheel carrier, in the sense of what has been said in detail above, and on the other hand they may permit the closest adjustment with regard to the workpiece cross-section or material cross-section, as the case may be, so that the saw band can always be guided directly beside the material and supported against the occurring cutting force. This is obstructed neither by the horizontal clamping jaw nor by the vertical clamping jaw.

For the generation of the feed magnitude in the cutting direction between wheel carrier or saw band on the one hand and material on the other, the wheel carrier may be displaceable in the cutting direction along a substantially horizontally extending securable guide that is pivotable about the vertical axis of rotation. Thus a translational movement of the wheel carrier in the cutting direction in relation to the material may be carried out.

Another possibility consists in principle in that the wheel carrier may be pivoted forward in the cutting direction about a horizontal tilt axis which is pivotable and securable about the vertical axis of rotation and is arranged substantially transversely of the cutting direction.

Thus while in the one case the wheel carrier is moved translationally in the direction towards the material and to this extent the saw band, maintaining its running direction, is guided by the material, in the other case for the wheel carrier a pivoting movement is provided about a bearing spindle, placed below the material, of the wheel carrier, about which spindle the wheel carrier and thus the saw band are arcuately moved through the material in the cutting operation.

For both possibilities of feed the horizontal guide and/or the tilt axis may be arranged on a machine part pivotable on the machine frame about the vertical axis of rotation. Thus here on the machine frame there is provided a machine part for the mounting and guidance of the wheel carrier, the machine part itself being pivotable about the vertical axis of rotation in accordance with the invention and thus entraining the wheel carrier itself about the vertical axis via the guide or tilt mounting of the wheel carrier, with regard to the adjustment in rotation.

For the formation of the machine part manifold design forms are conceivable. Some possibilities will be set forth below without thereby limiting the scope of the subject-matter of the invention.

However, in common to them all is that such a machine part may easily be mounted rotatably on the machine frame in a manner known per se so that high demands with regard to the accuracy and freedom from play are fulfilled.

Thus the machine part may be the already mentioned turntable, so that at the same time the support for the material to be sawn is present as a co-rotating unit and thus as an ever-present unit that is within wide limits independent of the miter angle.

It is in fact conceivable for the normal case that the mounting of the machine frame for the material comprises an aperture for the saw band such that the entire feed region for the saw band including the region provided leaves different miter angles free. When, however, the machine part carrying the horizontal guide or the tilt axis for the wheel carrier is a turntable, this part may include for the passage of the saw band a notch starting from the center or the vertical axis of rotation in the feed direction of the saw band; as a consequence, such a notch then shifts with the miter angle of the wheel carrier and thus the saw band always keeps its freedom of movement, nevertheless the support for the workpiece material is always reduced only by the size of the notch, whereby the working of short material pieces is rendered possible for the first time.

In order to make available to the wheel carrier the necessary freedom of movement in relation to the turntable, it is merely necessary for the turntable to possess, starting from its center of rotation in the direction towards the wheel carrier, an aperture of substantially quarter-circular form for the reception of the wheel carrier and the parts connected with it in the plane of the turntable, and to leave free the movement space of the wheel carrier between its two outer feed positions. Thus the aperture of the turntable is adapted in the plane of the turntable to the external contour of the wheel carrier including the parts connected with it so that the wheel carrier is almost freely movable within the turntable, which at the same time carries the horizontal guide or tilt guide of the wheel carrier in relation to the maximum feed movement. Since this aperture of the turntable is always situated, in relation to the workpiece or the material, substantially behind the stationary abutment bridge, the resting or supporting of the workpiece on the turntable cannot be impaired thereby.

As regards the mounting of the machine part or turntable comprising the horizontal and tilt guidance of the wheel carrier, expediently the machine part or turntable is mounted on the machine frame rotatably along its circumference. For this purpose, the machine part or turntable may be provided with a downwardly extending, circular-cylindrical extension which at its internal and external lower end has a respective horizontally surrounding guide groove, and guide rollers mounted rotatably about vertical axes on the machine frame engage with the guide grooves.

Thus a horizontal and vertical guidance of the machine part or of the turntable, mounted on a relatively large extent, is guaranteed which thus can be made correspondingly tilt-proof and stable, but on the other hand also guarantees that it cannot be contaminated or impaired by the sawdust occurring during sawing.

Another possibility consists in that the machine part or turntable is mounted rotatably in the region of the foot of the machine frame, while the machine part and/or turntable may be connected through vertical support means with a horizontal footplate, and the footplate may be rotatably mounted on the machine frame through a radial-axial bearing. The advantages mentioned above are correspondingly valid for this rotational mounting.

Where there is discussion above of a substantially horizontally extending guide for the wheel carrier, the horizontal guide of the wheel carrier may consist of a guide bar which is grasped by a corresponding guide part of the wheel carrier, and of a tilt or twist securing guide arranged parallel therebeside, into which an end of a support arm projecting from the guide part of the wheel carrier engages displaceably.

By this configuration of the horizontal guide an especially simple construction producable from ordinary components results which, however, guarantees a maximum of stability and security of the wheel carrier against tilting out of its vertical position.

Here the guide bar may have a substantially circular cross-section, resulting in an especially favorable production of the horizontal guide.

For the pivotability of the wheel carrier in the cutting direction about a tilt axis, advantageously this tilt axis is guided in the cutting direction of the saw band substantially horizontally adjustably and displaceably. Thus the object can be achieved that the saw band, after the cutting through of the workpiece material, assumes at the conclusion of the severing cut a vertical running direction, which proves especially favourable with regard, for example, to a horizontal clamping jaw. The shift of the tilt spindle can here be effected by a setting spindle which is mounted rotatably but axially non-displaceably on the pivotable machine part.

For both the above-described possibilities of the feed of the saw band in the direction towards the material, thus both for the horizontal feed and for the feed pivoting by tilting, expediently the feed means are pivotably articulated for the one part to the machine part and for the other part on the wheel carrier, while the feed means may, for example, be a hydraulic piston-and-cylinder unit or a setting spindle.

In order to adjust the feed value for the wheel carrier in dependence on the cross-section of the material to be sawn, in the case of the horizontal guidance of the wheel carrier advantageously at least one stop is arranged parallel to the horizontal guidance on the machine frame for limitation of the movement and optionally for the return of the wheel carrier. In this case the stop can be adjustable by a setting spindle rotatably mounted on the machine part, and detent noses may co-operate with the stop which noses are firmly connected, at least indirectly, with the wheel carrier.

Such stop means allow, in particular, the feed motion of the saw band to be limited so that the material is only partially incised, that is, the material is not completely cut through, such being possibly necessary especially for the production of cut-outs from the material, which case then such cut-outs can be produced by the vertical band saw according to the invention from various settings of the rotational position of the wheel carrier in combination with various feed positions of the workpiece material in its longitudinal direction, in that correspondingly the material is partly cut by the saw band at different miter angles, at two different positions.

The workpiece materials to be sawn have the most various cross-sections. On the other hand start is made with the vertical band saw from a correspondingly vertically extending cutting line. In the pairing of cutting line and workpiece cross-section to be partly cut, it may occur that at the start of cut the saw band meets with a large workpiece surface so that numerous teeth of the saw band come into engagement at the same time with the workpiece material, which is fundamentally problematical for a clean cutting start, irrespective of the cutting angle at which the saw band encounters the workpiece.

In the case of a vertical cutting arrangement for the cutting of different profiles, likewise favorable relationships arise between maximum and minimum cutting length, which leads to a reduction of the achievable cutting performance.

In order to counter this problem also within the scope of the invention for horizontally guided wheel carriers, according to a further embodiment the wheel carrier is tiltable in relation to its horizontal guide about a substantially horizontal axis placed transversely of the cutting line and is securable as regards the tilt position. Here, advantageously the tilt axis of the wheel carrier is arranged in the region of the center between the two vertical runs of the saw band.

Thus the object is achieved that the wheel carrier is tiltable in the direction towards the workpiece, according to the cross-sectional form of the material to be sawn, through an angle which can normally vary between 0° and 3°, but for which orders of magnitude of, for example 5° to 10° are conceivable, whereby for the start of the cut the saw band meets the workpiece at only a short length of engagement, whereby in turn initially only few teeth of the saw band come into engagement with the workpiece material, leading rapidly to good guidance of the saw band in the cutting start region and thus to a clean cutting start. By the variation of the cutting length proportions involved in this an increase of output occurs in the cutting of profiled materials.

For the constructive design of this tiltability of the wheel carrier advantageously the wheel carrier is tiltably or pivotably articulated by its guide part, co-operating in the longitudinal guide, and is securable as regards the tilt position or pivotal position. Here a setting device formable e.g. as a setting spindle may be inserted between wheel carrier and guide part for the adjustment and fixing of the tilt of the wheel carrier.

The above set of problems concerning a possibly desirable oblique start of the cut of the material arises essentially in connection with a horizontally guided wheel carrier. In the case of a wheel carrier which is pivotable in the feed direction or in the cutting direction about a tilt axis placed beneath the workpiece material, this problem is solved of its own accord by the commencement of cutting position of the saw band in relation to the material, resulting from the pivoting movement of the wheel carrier.

For the definitive limitation of the feed movement of the wheel carrier, irrespective of whether this feed movement is effected by horizontal displacement or by pivoting about a tilt axis, an operating arm extending into the movement region of an edge or face of the wheel carrier can be provided on the machine frame, which arm is adjustable in view of the material cross-section dependent feed magnitude of the wheel carrier. Thus here, in contrast to the stop already discussed above, one is concerned with an end stop the adjustment of which depends on the cross-section of the material to be worked in each case, and which assures that the wheel carrier is closed down and may be moved back each time after severing the material.

The operating arm mentioned in this connection may be arranged below the machine frame mounting site for the material to be sawn to co-operate with a front edge or front face of the wheel carrier. Thus, for example, in the case of the turntable emphasized above the arm may be fitted adjustably beneath the turntable.

As already mentioned several times above, the vertical band saw in accordance with the invention is suitable in its basic assembly above all for the execution of what are called freehand cuts, i.e. cutting operations in which the material is fed to the saw band by hand by way of the material mounting in a manually controlled manner. For this purpose it is especially expedient if the wheel carrier is arrestable in its foremost feed position in relation to the cutting direction, since then one can move a workpiece in a free manner in relation to the saw band largely without interference by further components of the vertical band saw. In this respect the vertical band saw in accordance with the invention also offers special advantages in that obviously all parts essential to the machine are kept out of the region of the material mounting so that the workpiece material in each case can be moved freely in relation to the saw band.

In summary, the invention has produced a vertical band saw which enables all operations arising in the sawing of material, especially material in rod form, in a simple manner without thereby resulting in a complicated machine which is difficult to handle and complicated and expensive in construction costs. On the contrary, the measures according to the invention result in a machine which overall is of light construction and correspondingly uncomplicated in handling, which can be produced cheaply and simply without the necessity of making a compromise in any manner whatever as regards versatile utility.

Further features and details essential to the invention appear from the following description of embodiments which are illustrated in the drawings, wherein the illustrations are limited to the reproduction of the essential parts, details being omitted.

DRAWINGS

DETAILED DESCRIPTION WITH REFERENCE TO FIGS. 1 to 4

Figure 1:
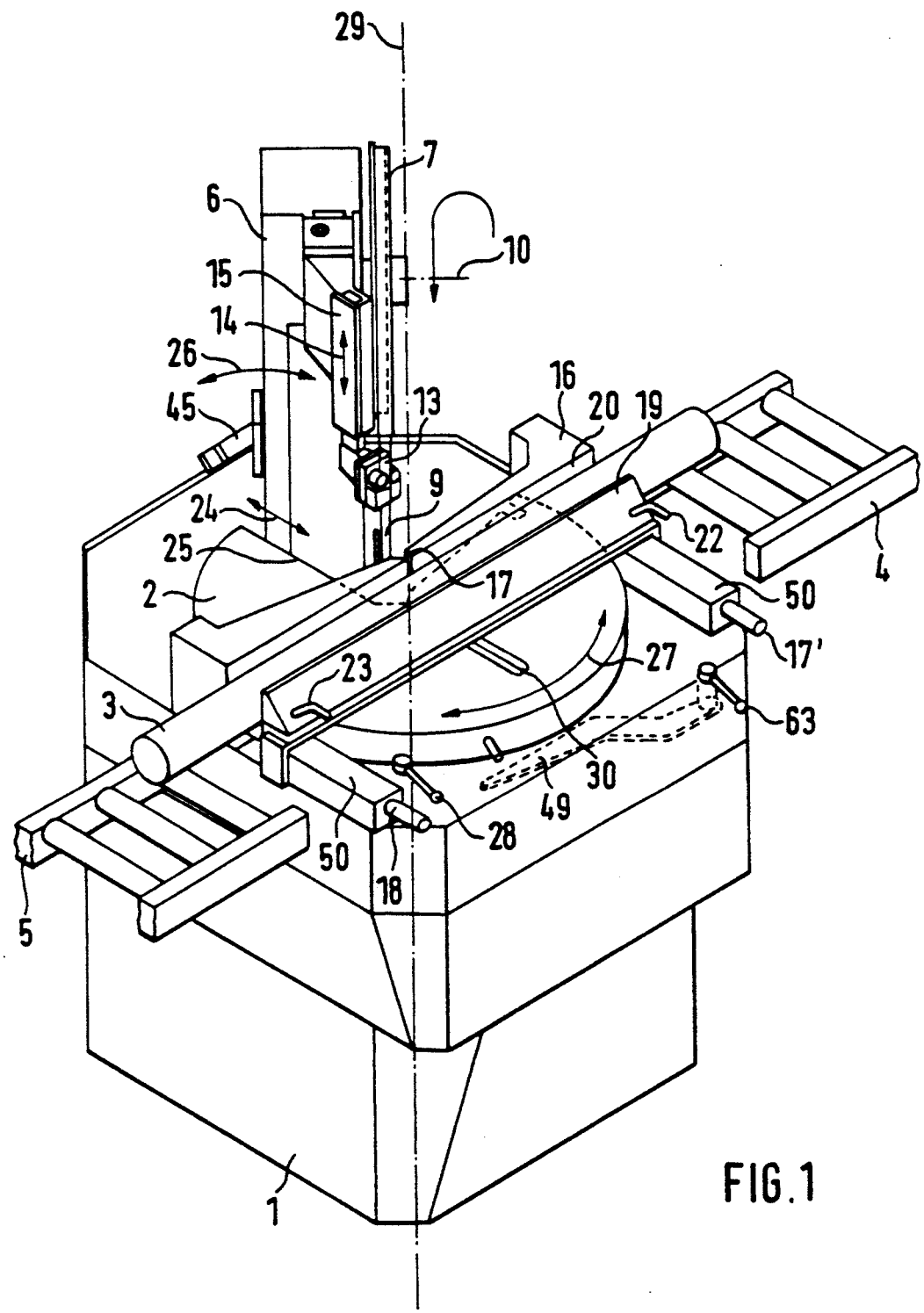
FIG. 1 shows a perspective overall view of the vertical band saw in accordance with the invention.

Here may be seen a machine frame 1 which has a work bench in the form of a turntable 2 to which the material 3 in rod form to be sawn is fed by way of a guide track 4, for example a rollway, and from which the severed material is transported away by way of a guide track 5, for example a rollway.

A vertical wheel carrier 6 is arranged on the machine frame 1. This comprises an upper runner wheel 7 and a lower runner wheel 8, over which wheels an endless saw band 9 circulates. The axes of rotation 10 of the wheels are inclined by an angle below 90°, in the present case 45°, in relation to the section plane 11 visible FIG. 4.

Guides 12 (see also FIG. 5 or FIG. 7) and 13 serve for turning the saw band 9 into the cutting plane 11, the guide 12 being arranged stationarily beneath the plane of support of the workpiece 3 on the wheel carrier 6 while the guide 13 is arranged vertically displaceably in a guide 15 on the wheel carrier in accordance with the direction of the arrow 14 in FIG. 1, and is fixable. The securing means of the saw band guide 13 within the guide 15 is not represented in detail: it may, for example, be a clamp screw or the like.

An abutment bridge 16 is arranged on the sides of the wheel carrier 6 stationarily on the work bench of the machine frame 1 for the purpose of retaining on the turntable 2 of the material 3 to be sawn. The bridge 16 in the present case consists of two sections which in the middle permit the passage of the saw band 9 in the direction towards the workpiece material by means of an incision or notch 17. The parts of the abutment bridge 16 are firmly connected, outside the turntable 2, with the machine frame 1 and between these connections permit free mobility for the turntable 2.

Guide rods 17', 18 extend transversely of the direction of the workpiece from the outer ends of the abutment bridge parts 16. A clamping jaw 19 is displaceably guided on these rods to clamp the workpiece material 3 against a clamping face 20 of the abutment bridge with its own, likewise vertical clamping face 21. The clamping jaw 19 can be secured on the guide rods 17' and 18, for example, by means of clamping screws 22, 23 which can be actuated by hand.

Figure 2:
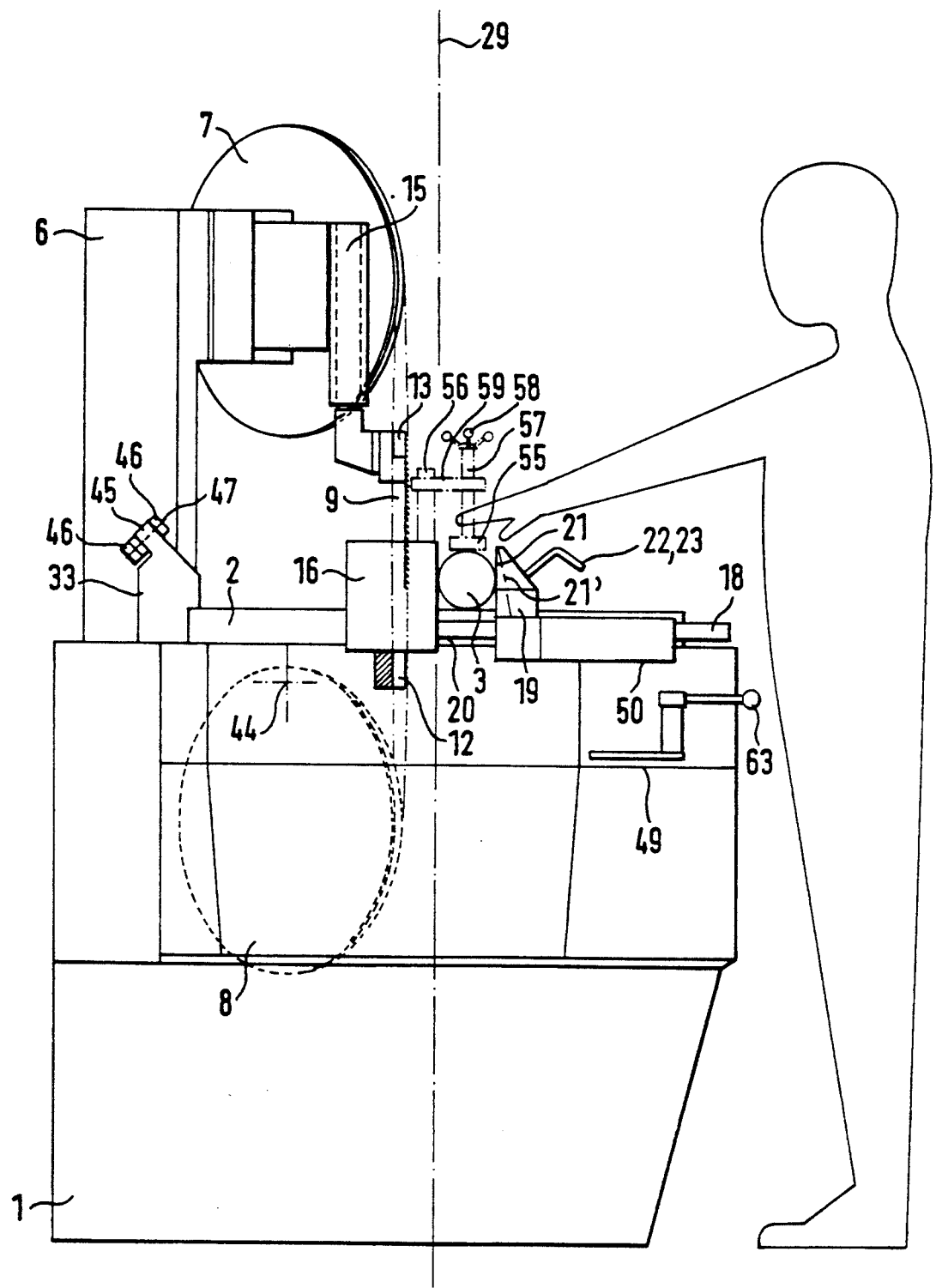
FIG. 2 shows a lateral elevation of the machine according to FIG. 1.
Figure 3:
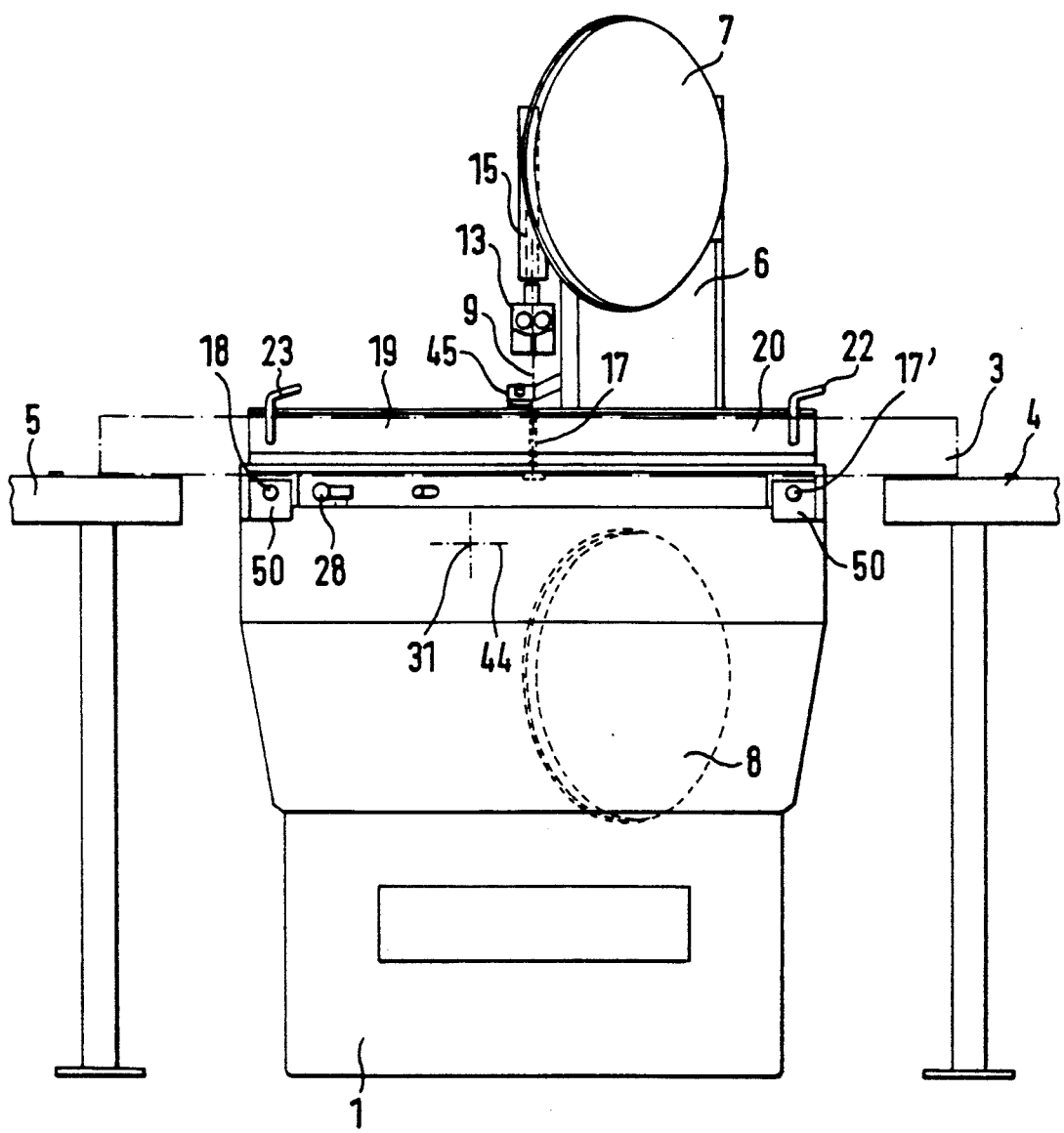
FIG. 3 shows a front elevation of the machine according to FIG. 1.

The clamping jaw 19 may also be provided, as indicated in FIG. 2, with a clamping face 21' which is inclined to the vertical in the downward cutting direction, proceeding away from the saw band. Thus the wedge effect exerted by the saw band between the material and clamping jaw may be utilised in the sense of better retaining of the workpiece material.

Alternatively to the clamping jaw 19, or supplementing it, a vertical clamping jaw 55 may be provided which, as indicated in FIG. 2, is perpendicularly movable by a setting spindle 57 on a holder 56 secured on the abutment bridge 16. The setting spindle 57 is manually actuatable by a cross-grip 58. In this case the mounting 59 of the setting spindle may be formed pivotably about the holder 56 and variably in its horizontal length so that different distances between holder 56 and setting spindle 57 can be set.

For the execution of the sawing operation, as indicated by double arrows only with reference to FIG. 1, the wheel carrier 6 is displaceable along the arrow 24 horizontally in the direction towards the material 3 to be sawn. In order to make the necessary freedom of movement available to the wheel carrier for this purpose within the turntable 2, the turntable includes an aperture 25 of substantially quarter-circular form which corresponds to the horizontal external contour of the wheel carrier 6 together with the parts connected therewith in the region of the turntable plane.

The wheel carrier is tiltable in relation to the vertical along the arrow 26, and in such a tilting movement the saw band 9 remains with its part lying between the guides 12, 13 within the section plane.

In accordance with a feature of the invention, the wheel carrier 6 is rotatable or pivotable about axis 29. The turntable 2, see arrow 27, accompanies this pivoting movement so that miter angles can be set in relation to the material 3 to be sawed. The pivotal position of the turntable 2 and hence of the carrier 6 is lockable, or arrestable at the desired miter angle in each case. Means known per se may serve for such arresting. Here for the sake of simplicity the handle 28 of an appropriate clamp device, e.g. an eccenter, is illustrated.

Finally it should be especially emphasized that the pivot axis 29 of the turntable 2 and thus also of the cutting plane of the saw band 9 lies in the clamping face 20 of the abutment bridge 16, that is, coincides with the line along which sawing of the workpiece material 3 is commenced. Thus the location of the commencement of sawing of the workpiece 3 always results at the same position irrespective of the pivotal position in which the turntable 2 and wheel carrier 6 are situated. Thus the necessity is avoided of taking into consideration of different starting points of cutting on the workpiece material, for the different settings of the turntable 2 and the wheel carrier 6. This is important for the setting of measuring stops for the workpiece material, since then no correction of length needs to be effected in dependence upon the set angle.

In order that the saw band 9 may move in a collision-free manner during the cutting feed within the turntable 2, the turntable 2 has an incision 30 for the saw band which, in accordance with what is said above, co-rotates according to the angular position of the turntable and the wheel carrier. This incision ensures that the support area of the workpiece material 3 on the turntable 2 is as large as possible.

Further details of the assembly of the vertical band saw thus initially explained in outline, including its essential modes of operation, are now to be clarified by reference to the further drawings.

Firstly with reference to FIGS. 5 to 8 the mounting of the wheel carrier 6 with regard to the feed movement along the arrow 24 according to FIG. 1 is to be discussed.

Figure 5:
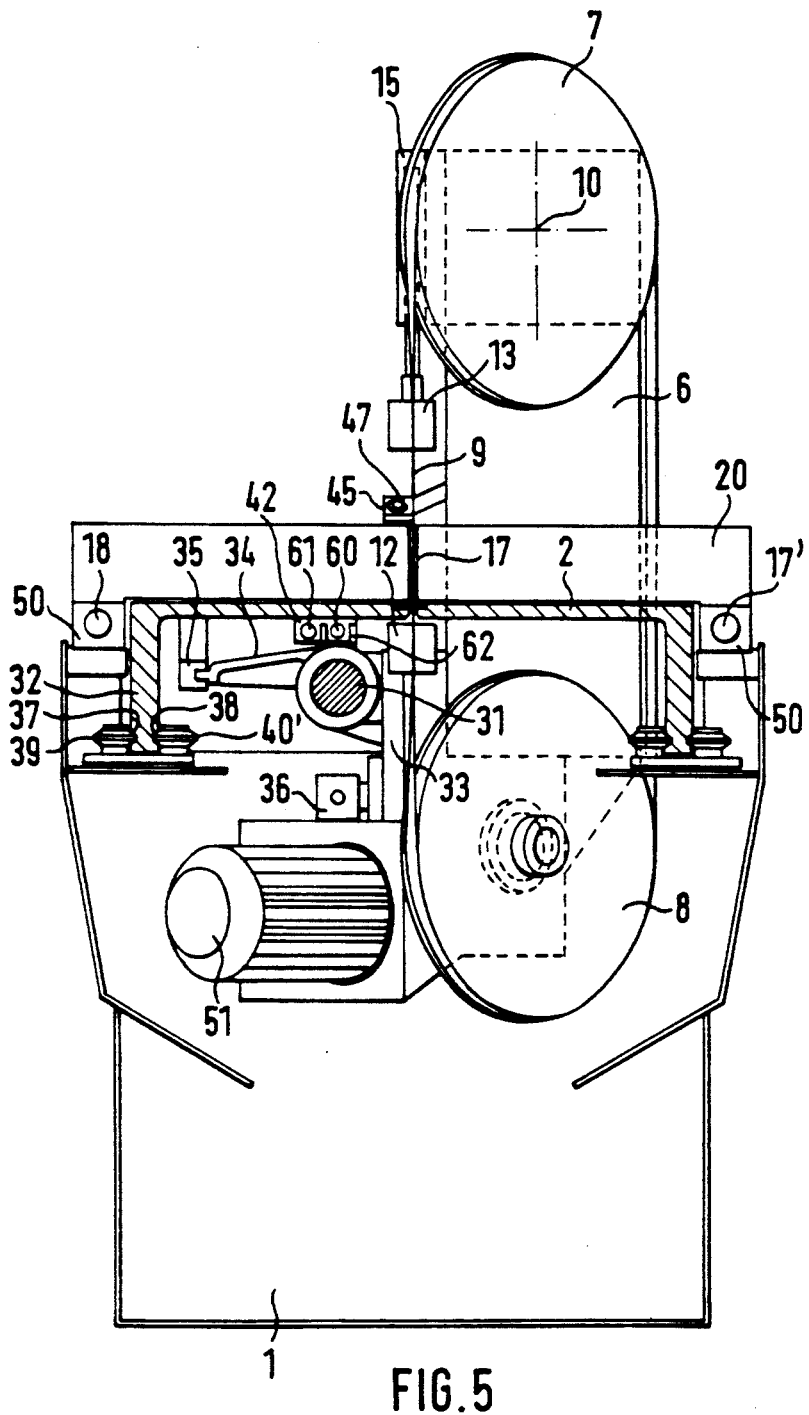
FIG. 5 shows a vertical sectional view of the machine along the section line V—V in FIG. 4.
Figure 6:
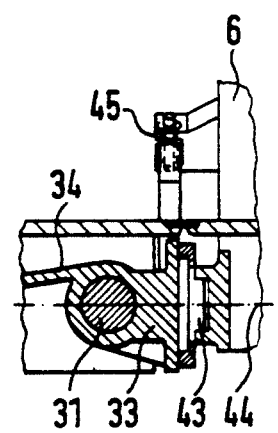
FIG. 6 shows a detail sectional view of the machine along the section line VI—VI in FIG. 4.
Figure 7:
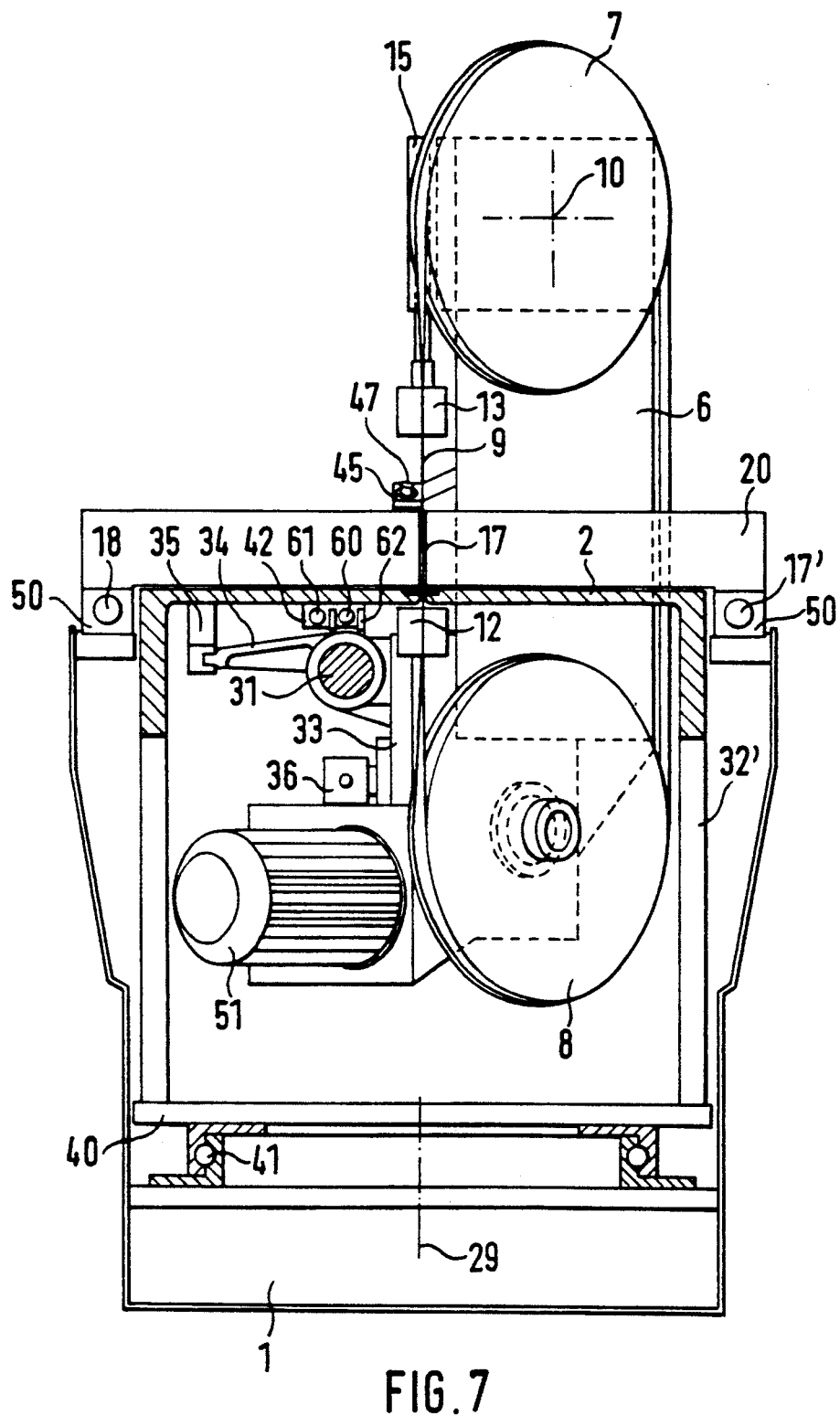
FIG. 7 shows a variant of the machine in the illustration according to FIG. 5.
Figure 8:
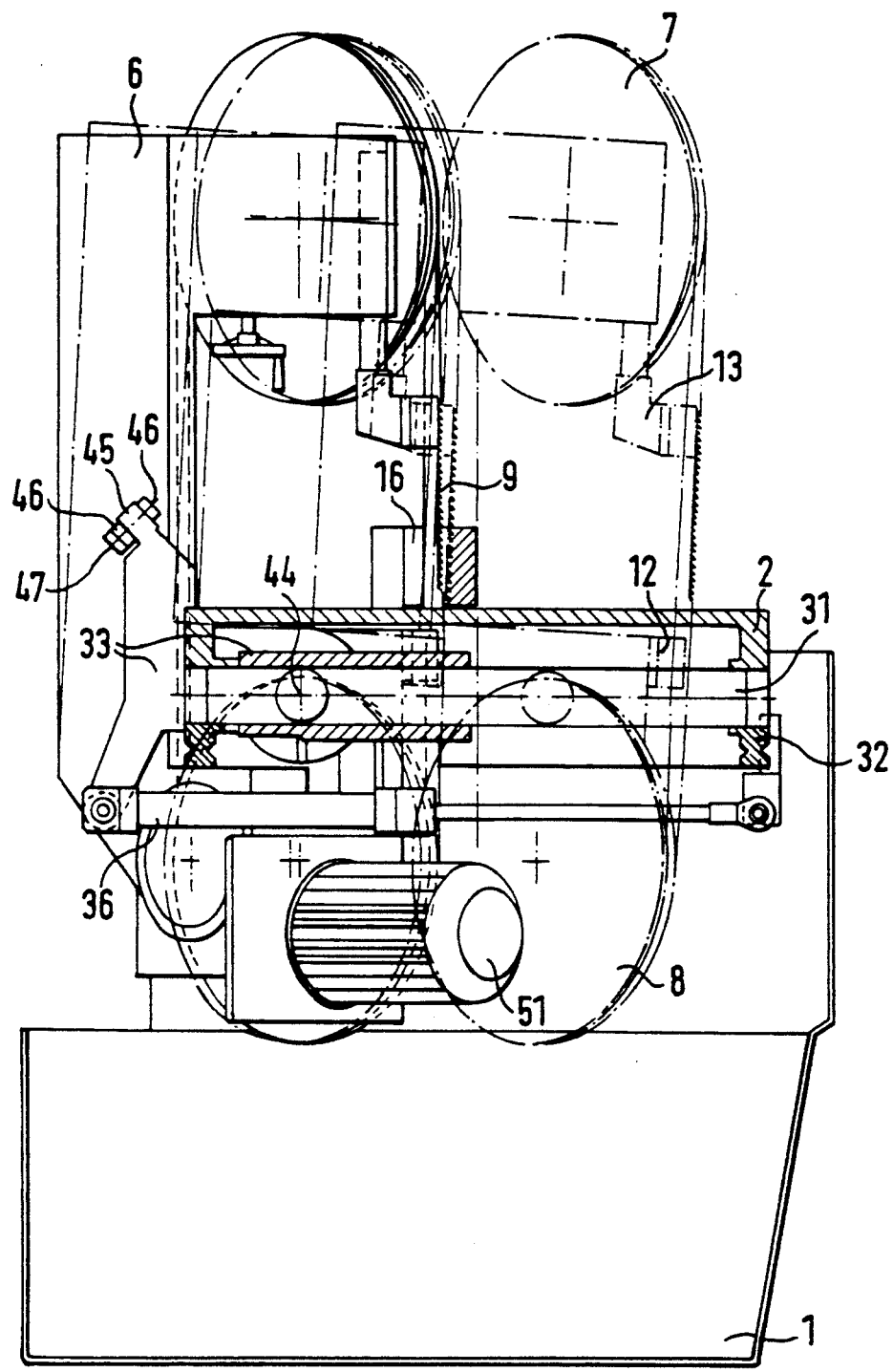
FIG. 8 shows a sectional view of the machine along the section line VIII—VIII in FIG. 4.

As may be seen from FIGS. 5, 7 and 8, a guide bar 31 of substantially circular cross-section is connected with the turntable 2 through a right cylindrical extension piece 32 or vertical support means 32' extending downwardly from the region of the workpiece support. The wheel carrier 6 is displaceable on the guide bar 31 parallel to the cutting plane with a guide part 33 which completely surrounds the guide bar 31. To ensure that the wheel carrier 5 cannot tilt on the guide bar 31, a support arm 34 extends from the guide part 33 and engages with its free end in a rotation-securing guide 35 which is arranged parallel to the guide bar 31 on the turntable 2.

The general of the feed movement is effected by a piston-and-cylinder unit 36 which pivotably engages on the one hand on the right cylindrical extension piece 32 and/or the support means 32', as the case may be, while on the other hand it is articulated to the guide part 33 which is in connection with the wheel carrier 6.

In this way a simple and cheaply produced feed guide for the wheel carrier results.

FIGS. 5 and 7 shows at the same time also different mountings of the turntable 2 and thus essentially also the guide bar 31 of the wheel carrier 6.

Thus according to FIG. 5 the lower end of the right cylindrical extension piece 32 of the turntable 2 is provided with inwardly and outwardly horizontally surrounding guide grooves 37, 38, into which engage guide rollers 38, 40' mounted rotatably on the machine frame 1 about vertical axes. As may be seen from FIG. 9, these guide rollers are distributed several times about the circumference of the turntable. Thus on the one hand an especially stable turntable mounting is produced along a large circumference in a tiltproof manner and the wheel carrier 6 with the machine parts connected therewith, on the other.

FIG. 7 shows another embodiment, wherein the turntable 2 is provided with downwardly extending support means 32' which are connected with a footplate 40 which in turn is rotatably mounted through a radial-axial bearing 41 on the machine frame 1. The axis of rotation is in each case, as already explained in connection with FIG. 1, the spindle 29 which is also visible once again from FIG. 7.

FIGS. 5 and 7 moreover show stop means 42, arranged parallel to the horizontal guide of the wheel carrier 6 on the turntable 2, for movement limitation and optional reversal of the sheel carrier 6 in the feed direction along the guide bar 31. These stop means, displaceable on a guide 61, can be adjustable by a setting spindle 60 mounted on the turntable 2. With them co-operate detent noses 62 connected with the guide part 33 and thus indirectly with the wheel carrier. Thus the feed movement of the wheel carrier 6 can be limited as desired so that correspondingly partial cuts, as deep as desired, can be executed in the material, that is, cuts by which the material is only partially severed. If then, for example, after the advance of the material 3 a further partial cut of equal depth is executed with another suitable angle setting of the cutting plane 11, in this way a wedge-shaped aperture can be produced in the workpiece material.

Furthermore the possibility of a tilt adjustment along the direction of the arrow 26 in relation to the wheel carrier 6 is mentioned with reference to FIGS. 1 to 4. In order to realise this, as shown especially by FIG. 6 in combination with FIG. 8, the guide part 33 is interrupted so that the wheel carrier 6 is articulated tiltably or pivotably on the guide part, and is securable as regards the tilt or pivotal position. For this purpose according to FIG. 6 the guide part 33, with which the wheel carrier 6 is in engagement via the guide bar 31, is interrupted by a rotary connection known per se while, as may be seen for example from FIG. 2, the axis 44 of the rotary connection is arranged in the region of the middle between the two vertical runs of the saw band 9.

A setting device 45 arranged between the section of the guide part 33 arranged on the wheel-carrier side of the rotary connection 43 serves for the adjustment of the tilt position of the wheel carrier 6 in relation to the horizontal guide. The piston-and-cylinder unit 36 is also articulated to the part 33, as is the setting device 45 arranged at the wheel carrier 6. The setting device consists of a fork secured to the wheel carrier 6, with fork prongs 46 protruding from the wheel carrier, and permits the adjustment of the tilt position of the wheel carrier 6 by, for example, actuation of a setting spindle 47, which acts with a threading on the part 33 and is mounted rotatably but axially non-displaceably on the fork prongs in a manner not further illustrated. By the setting of the setting device 45, however, the tilt position within the rotary connection is also arrested.

Figure 4:
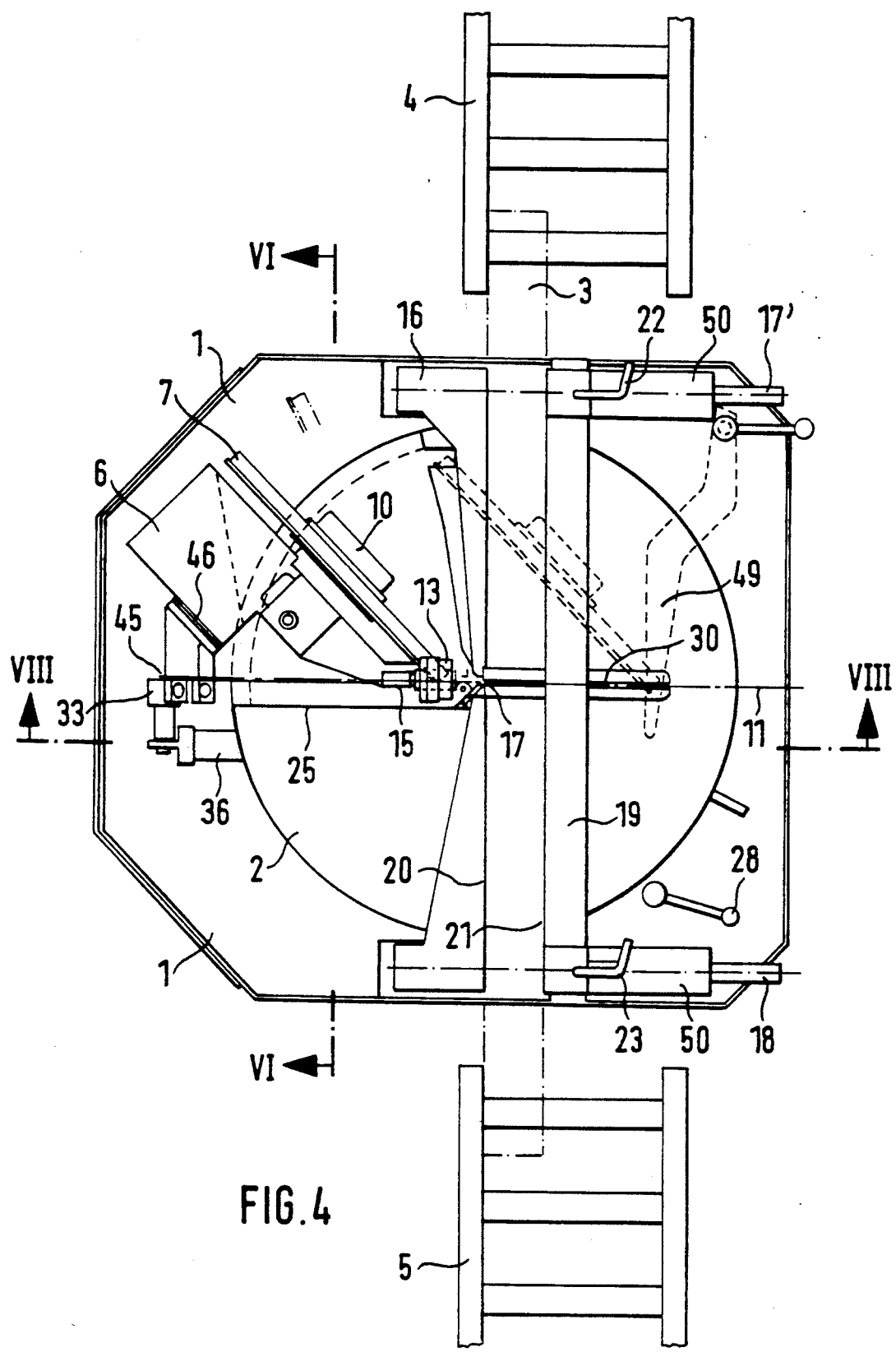
FIG. 4 shows a plan view of the machine according to FIG. 1.

With regard to the normal feed limitation for the saw band 9 as a function of the cross-section of the material 3 present in each case, reference is made once more to the illustration in FIG. 4. There an operating arm 49 may be seen in chain lines, which is arranged pivotably mounted beneath the turntable 2 on the machine frame 1. This operating arm, which can be position or adjusted in a manner known per se, for example by hand and can be made fast by a clamping screw 63, can co-operate with a part of the wheel carrier 6 such that on collision of this wheel carrier part the feed motion of the saw band can be interrupted and, if desired, reversed by the action of known control means.

In the introduction to the description, moreover, the possibility of freehand sawing was discussed. For this purpose the disengagement of the displaceable clamping jaw 19 from its guide blocks 50, visible in FIG. 1, is possible with the aid of the clamping screws 22, 23 so that an appropriately releasing of the clamp connection of the turntable 2 by means of the handle 28 when a workpiece is resting on the turntable 2, the feed movement of the material 3 can be effected by hand while at the same time an operator can cut through a workpiece of any corresponding contours by hand, by rotation of the turntable 2 and thus also of the saw band guide 6. Thus after removal of the clamping jaw 19 for this freehand sawing the machine as described offers no obstructions of any kind. For the execution of such freehand sawing, moreover, the wheel carrier 6 is driven into its foremost position and made fast there so that the saw band is correspondingly freely accessible from all sides.

Figure 9:
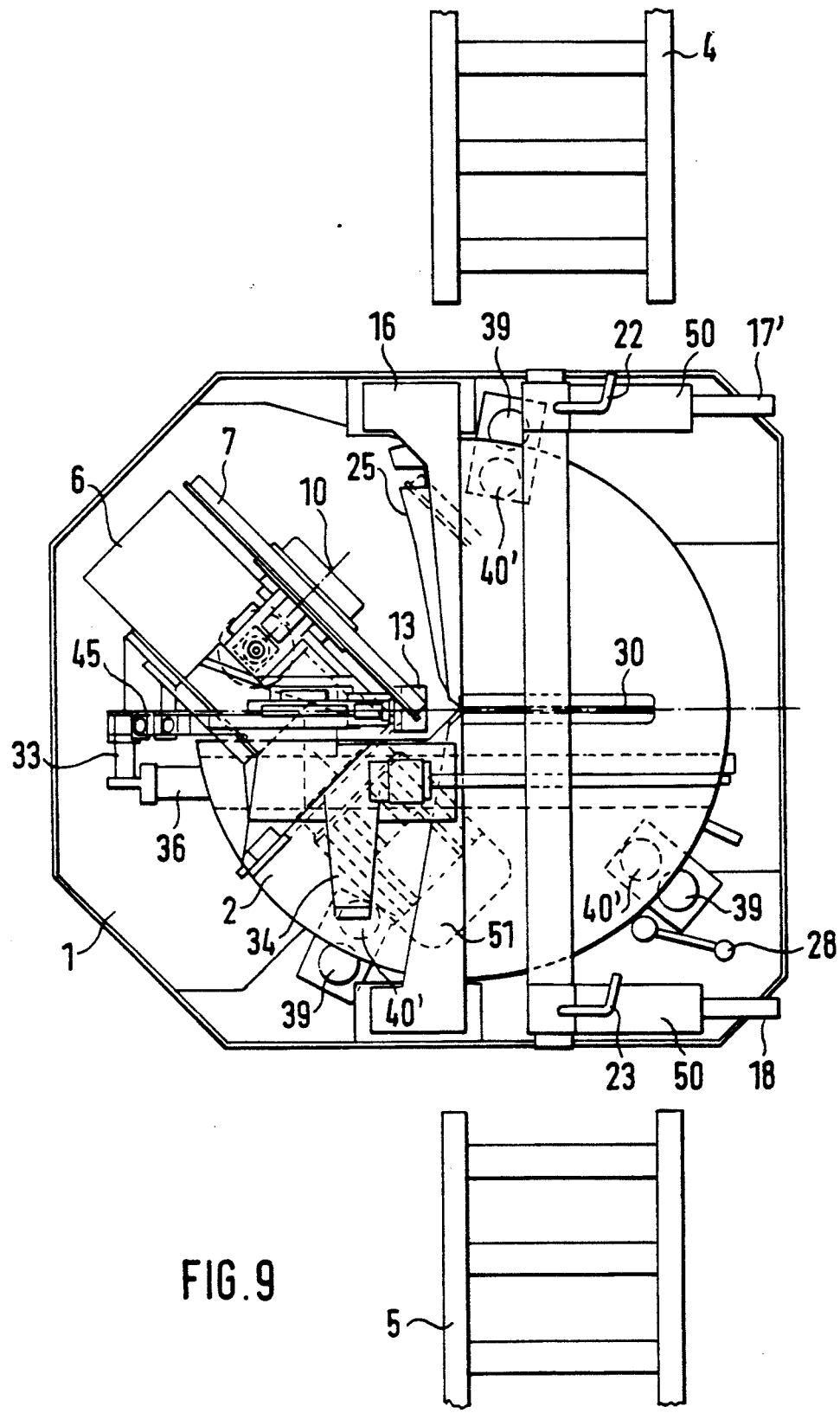
FIG. 9 shows a supplemented and differently drawn plan view of the machine in a view according to FIG. 4.

FIG. 9 again shows a plan view of the vertical band saw in accordance with the invention with an illustration of the machine components that is as complete as possible, even those present beneath the working plane. From this it may be seen that especially the drive motor 51 is also connected as a construction unit with the wheel carrier. The control panel for the setting of the operational and feed values additionally belongs to the further construction units (not shown) which are present. In this way FIG. 9 shows especially clearly how the wheel carrier is formed, together with all devices and units necessary for the operation of the saw band, as a saw unit mobile almost independently on the turntable and thus on the machine frame, which unit is subject to no limitations of any kind in its freedom of movement with regard to the action upon the workpiece, in order that miter cuts, partial cuts, freehand-sawn contours etc. may be produced on the workpiece. Thus the vertical band saw in accordance with the invention proves to be a machine adaptable to all requirements ordinarily occurring in operation, while maintaining optimum conditions valid for the sawing of workpiece material.

By reference to FIGS. 10 to 15 now the various possibilities of miter cuts are to be illustrated yet again in simplified plan view, the adjustable clamping jaw 19 also being omitted in each case, in order to indicate corresponding possibilities of freehand cutting.

Figure 10:
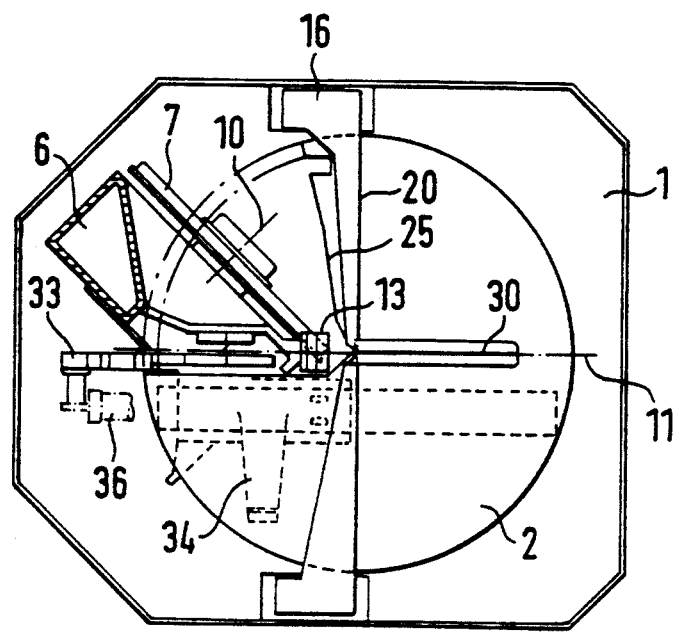
FIGS. 10 to 15 show different working positions of the machine according to FIGS. 1 to 9, in simplified plan view.
Figure 11:
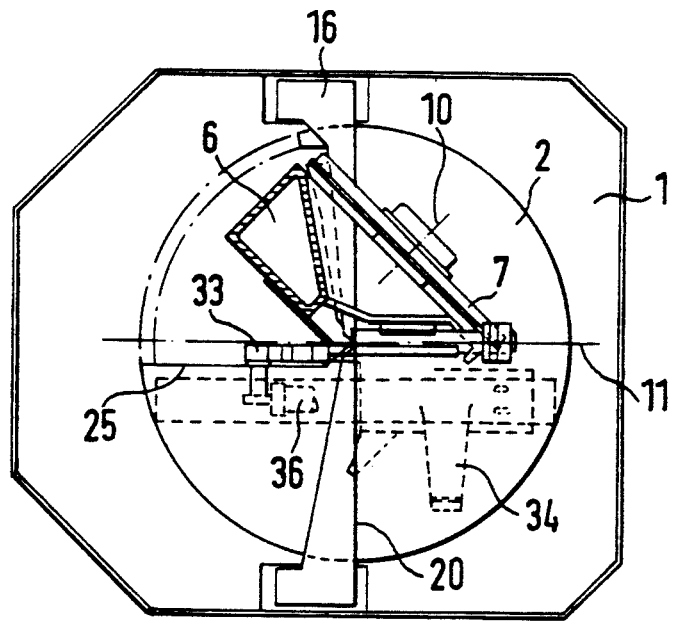

According to FIGS. 10 and 11 the vertical band saw is shown at the beginning of cutting, on the one hand, and at the end of cutting as regards a maximum workpiece cross-section on the other hand. Thus here the wheel carrier 6 is shown in one case in the initial position and in the other case in the position of maximum possible advance, and the position of maximum possible advance according to FIG. 11 also shows how the external contour of the wheel carrier together with the pertinent parts in the region of the turntable 2 fits into the quarter-circular aperture 25 of the turntable. FIGS. 10 and 11 show a cutting plane perpendicular to the clamping face 20 of the abutment bridge 16, that is, transverse to the feed direction of the workpiece material.

Figure 12:
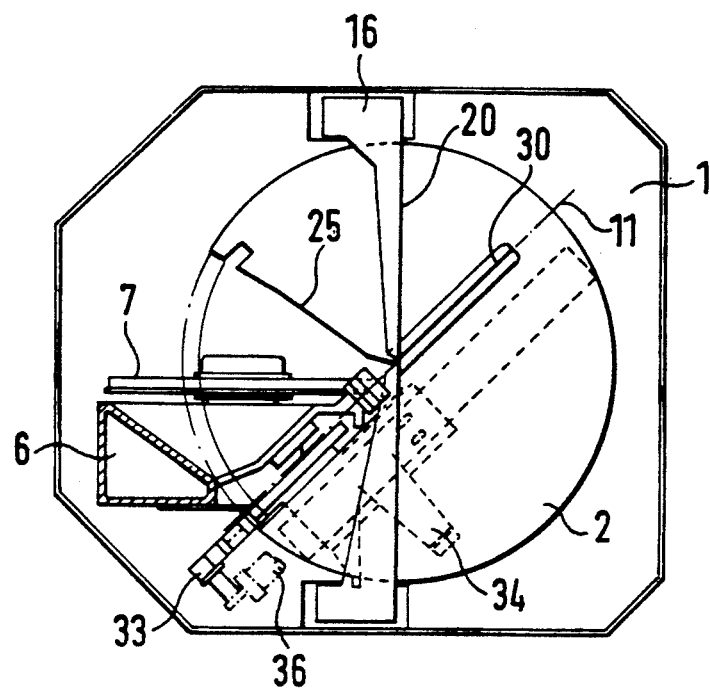
Figure 13:
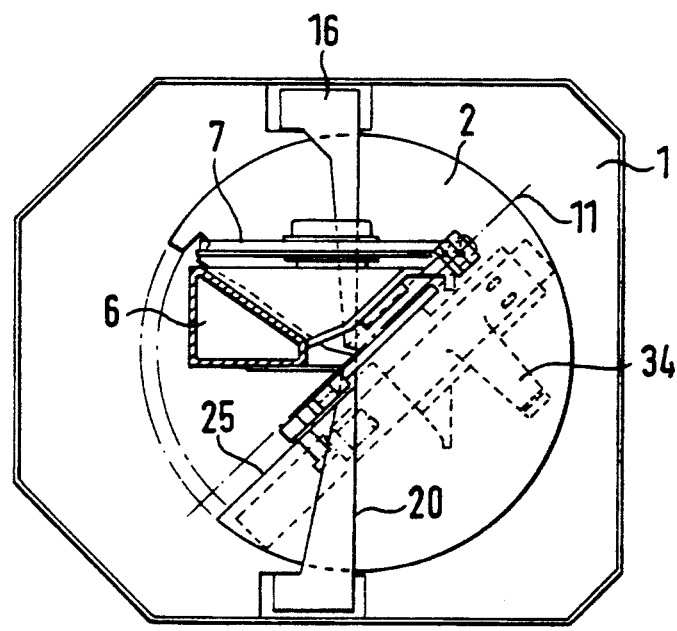

In contrast, FIGS. 12 and 13 show a pivotal position in which the cutting plane assumes approximately an angle of 45° to the said feed direction of the workpiece material, this angle being measured backwards oppositely to the feed direction of the material.

Figure 14:
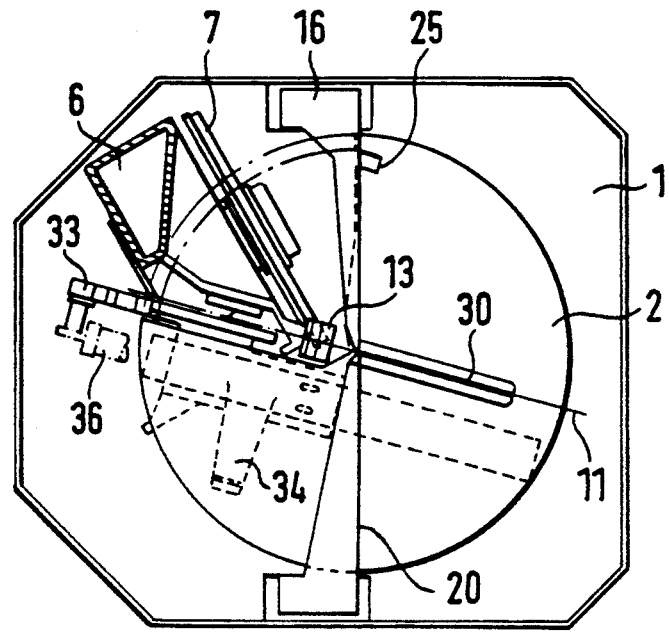
Figure 15:
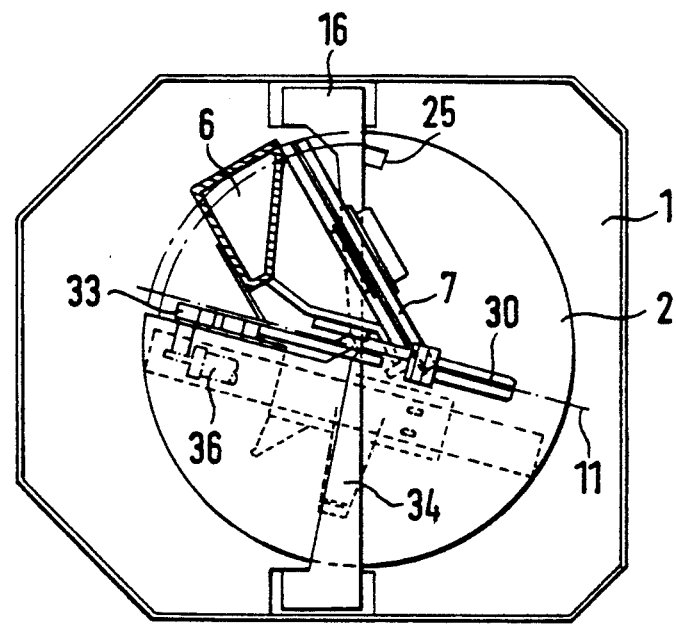

On the other hand, FIGS. 14 and 15 show another pivotal position of the wheel carrier 6 in which the cutting plane of the saw band is dimensioned at a miter angle of about 20° in relation to the direction perpendicular to the feed direction of the workpiece material, namely this time forwardly relative to the material feed direction.

FIGS. 12 and 13 especially, however, make the following clear: when a saw band must be replaced, for this purpose there must be the freest possible accessibility and freedom of movement with regard to withdrawal of the saw band to be replaced and insertion of the new saw band. For this purpose specifically in the machine adjustment according to FIGS. 12 and 13 it is possible to approach the wheel carrier in an especially favourable manner from the side of the vertical band saw, without the abutment bridge 16, the clamping jaws 19 etc., being in the way in a troublesome manner to any particular extent. This is valid especially when the machine is set up against a wall, in a manner not illustrated here, with the back, that is with the outer side on the left in relation to FIGS. 12 and 13 so that it is not possible to gain access to the machine from the rear.

Further embodiments of the subject-matter of the invention are illustrated in simplified form in FIGS. 16 to 22 which will be explained hereinafter, while the explanations and modes of operation given with reference to FIGS. 1 to 15 are also substantially valid for these embodiments.

Figure 16:
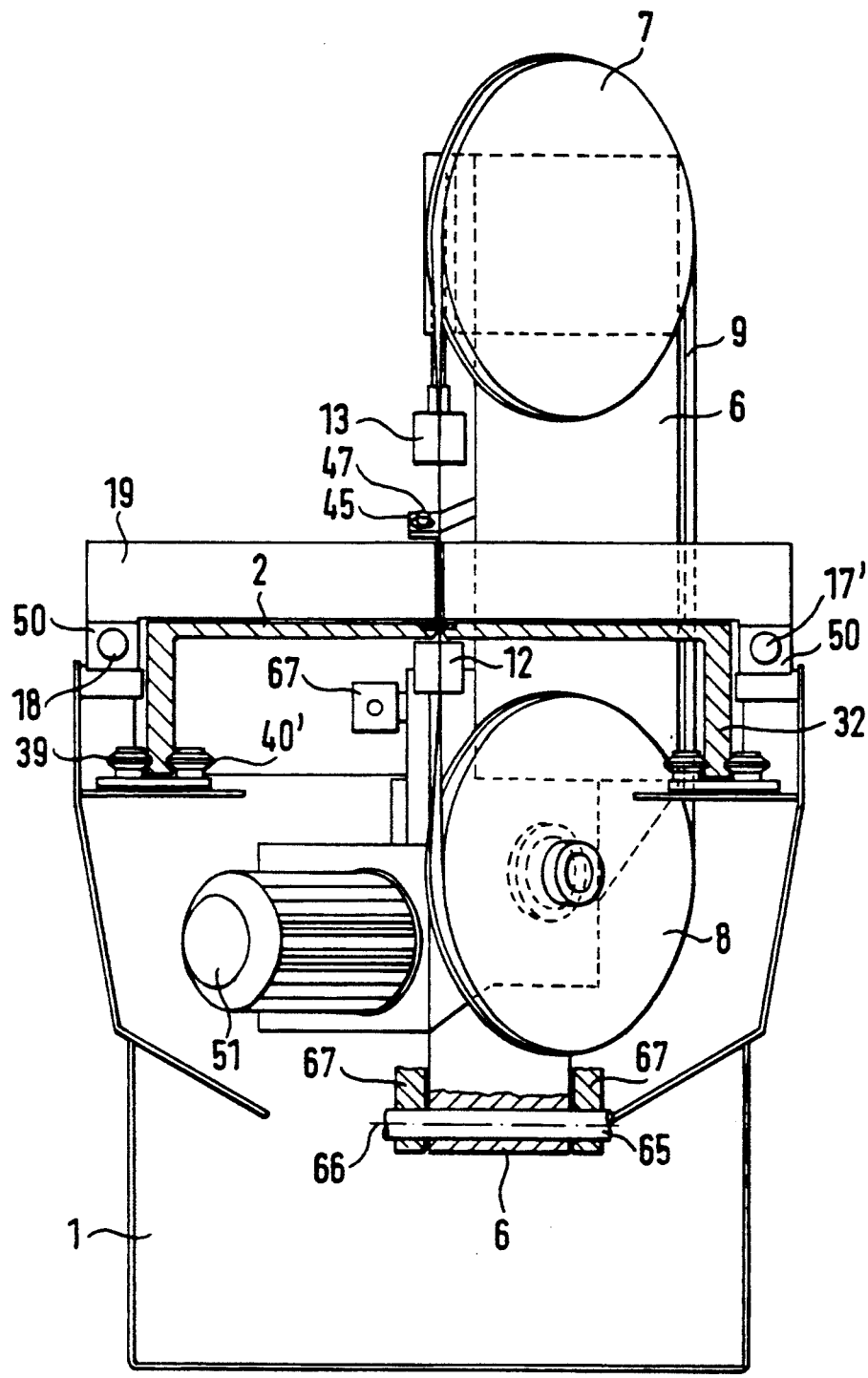
FIG. 16 shows a constructional modification of the vertical band saw in cut-away elevation after the manner of FIG. 5.

While in the construction described with reference to FIGS. 1 to 15 the wheel carrier 6 is always displaceable substantially horizontally in the direction towards the material 3 on a machine part in the form of a turntable 2, other fundamental possibilities are also conceivable for this feed motion. The illustration in FIGS. 16 and 17 shows one of these possibilities.

Here the lower end of the wheel carrier 5 is mounted pivotably about a spindle 66 by means of a shaft 65, the spindle 66 extending horizontally transversely of the cutting plane provided by the saw band 9. The shaft 65 for its part is seated in support means 67 in the form of vertical side pieces arranged on both sides of the wheel carrier 6, which side pieces in their turn are secured in an incompletely illustrated manner on the underside of the turntable 2.

Figure 17:
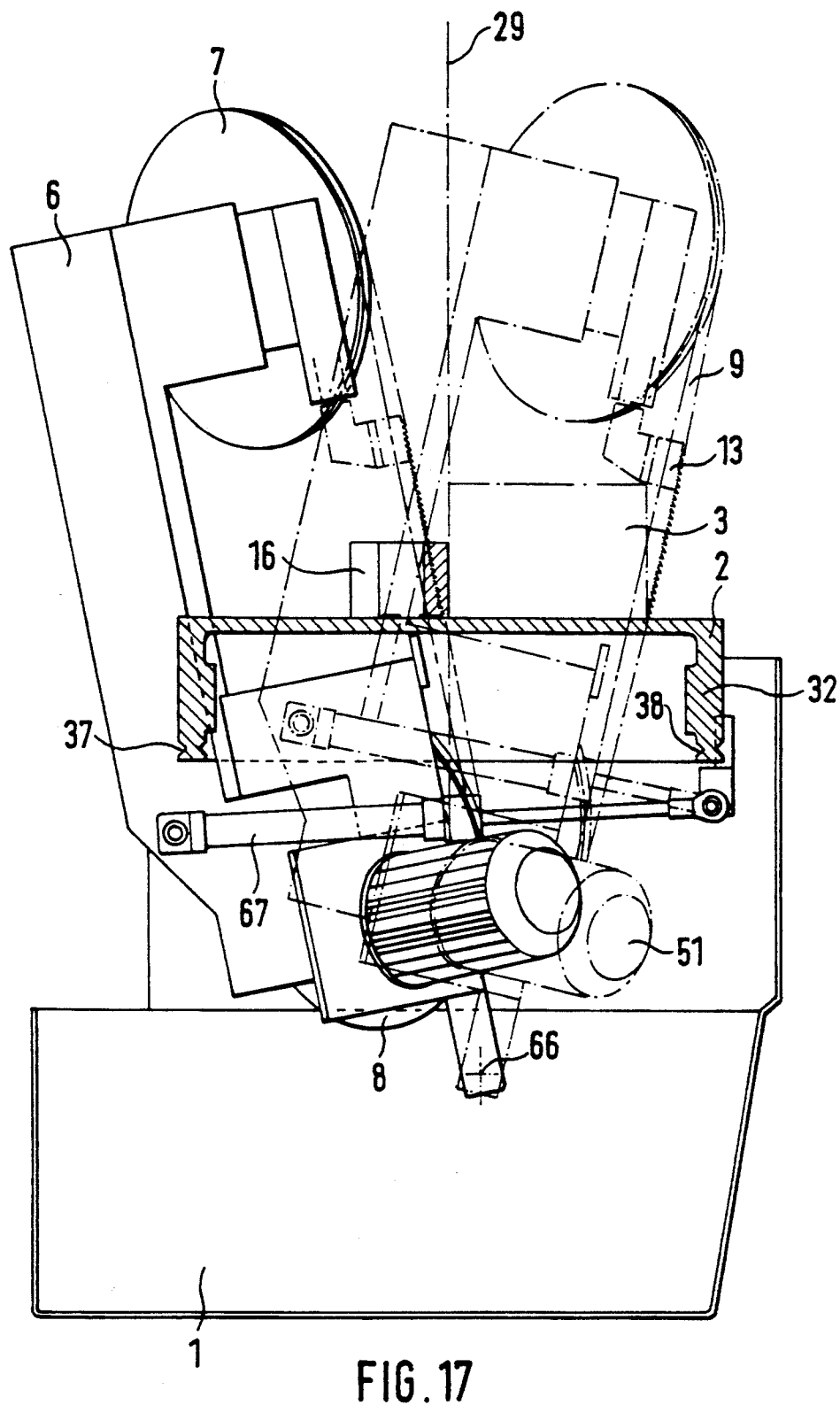
FIG. 17 shows a cut-away lateral view of the machine according to FIG. 16 in the cut-away illustration after the manner of FIG. 8.

As may be seen especially from FIG. 17 the wheel carrier 6 is pivotable about the spindle 66 over the cross-sectional region of a material 3 to be sawn, the pivoting movement being generated by a piston-and-cylinder unit 67 which is pivotably articulated for the one part to the turntable 2 and for the other part to the wheel carrier 6.

As may be seen, in this case again the wheel carrier 6 is pivotable about the vertical axis 29 already described in detail earlier, together with the pivotability of the turntable 2, in the manner likewise already described above.

In the case of this embodiment likewise the advantage is present that the sawing of the workpiece material 3 is started in each case with a tilted position of the saw band 9, so that in the sawing commencement action only a few teeth of the saw band 9 come into engagement with the material 3. Admittedly the constructional form according to FIGS. 16 and 17 has the consequence that at the end of the severing cut the saw band 9 likewise has a tilted position in relation to the material 3, so that in a manner not further illustrated the clamping jaw 19 already mentioned with reference to FIGS. 1 to 4 must consist of easily sawable material so that the saw band 9 can cut into this material which can be replaced after a certain time.

Figure 18:
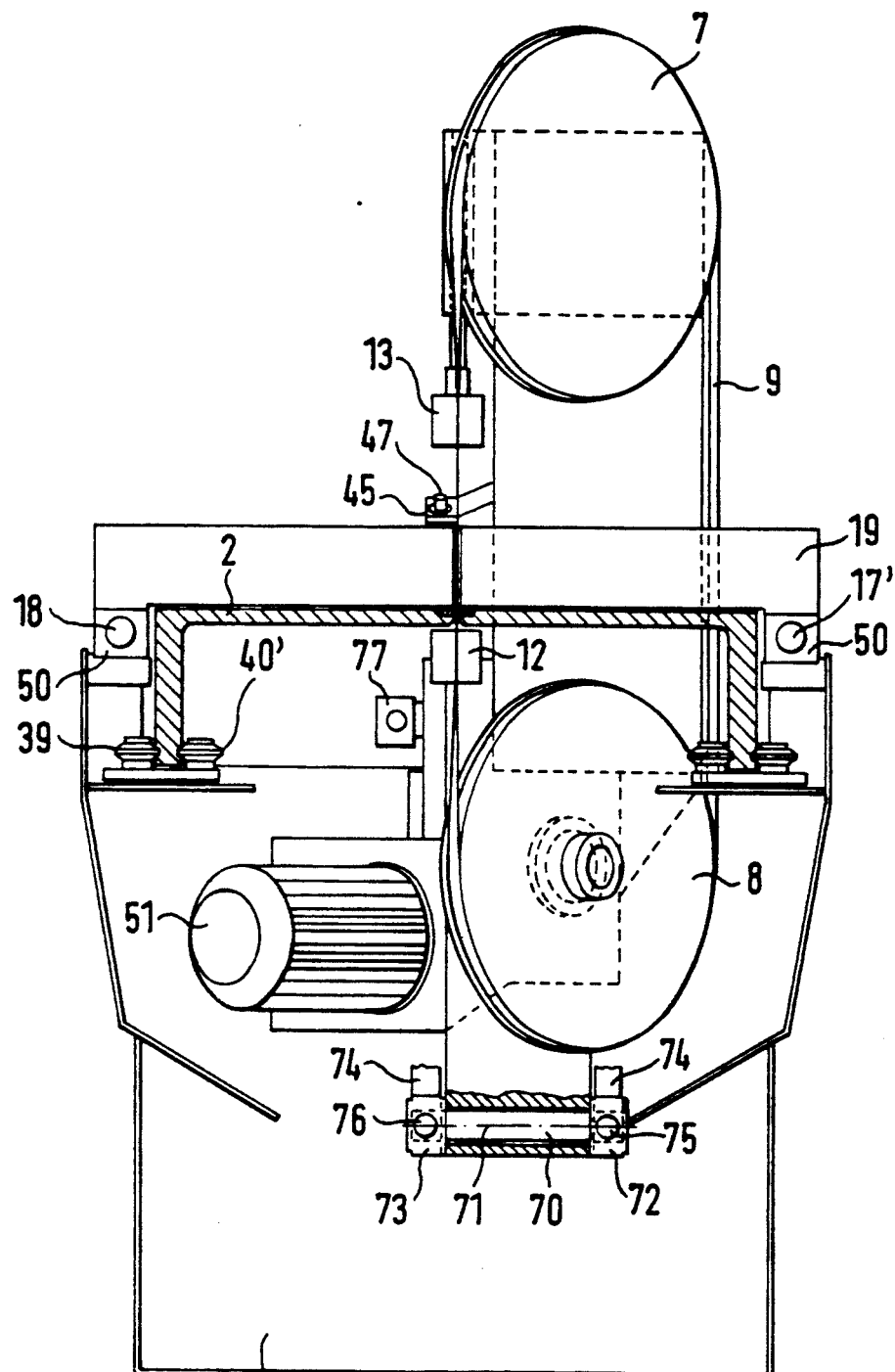
FIG. 18 shows a further constructional modification of the machine in the cut-away illustration after the manner of FIG. 5.
Figure 19:
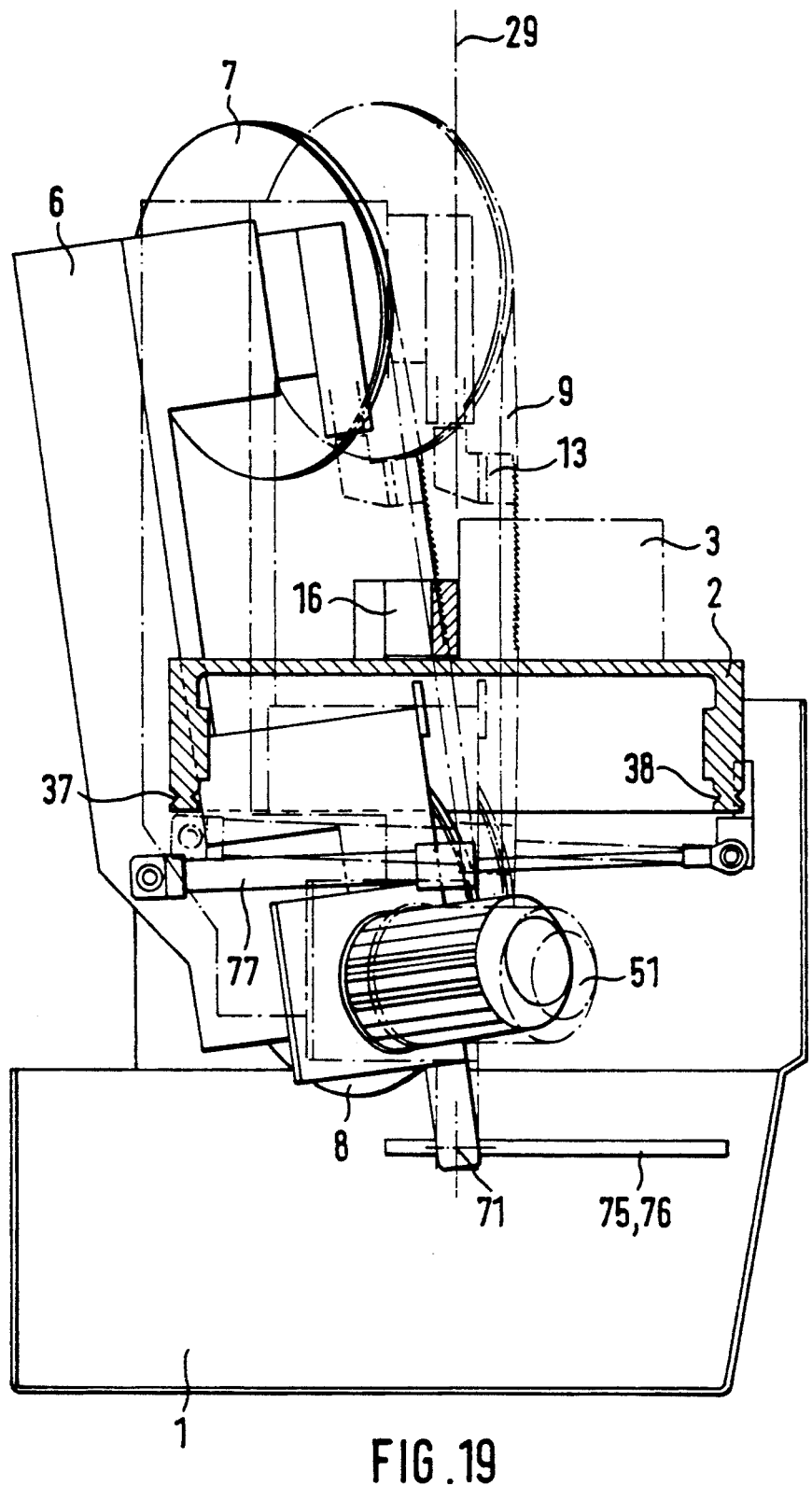
FIGS. 19 and 20 show the lateral elevation of the machine according to FIG. 18 in two different working positions and cut-away after the manner of FIG. 8.
Figure 20:
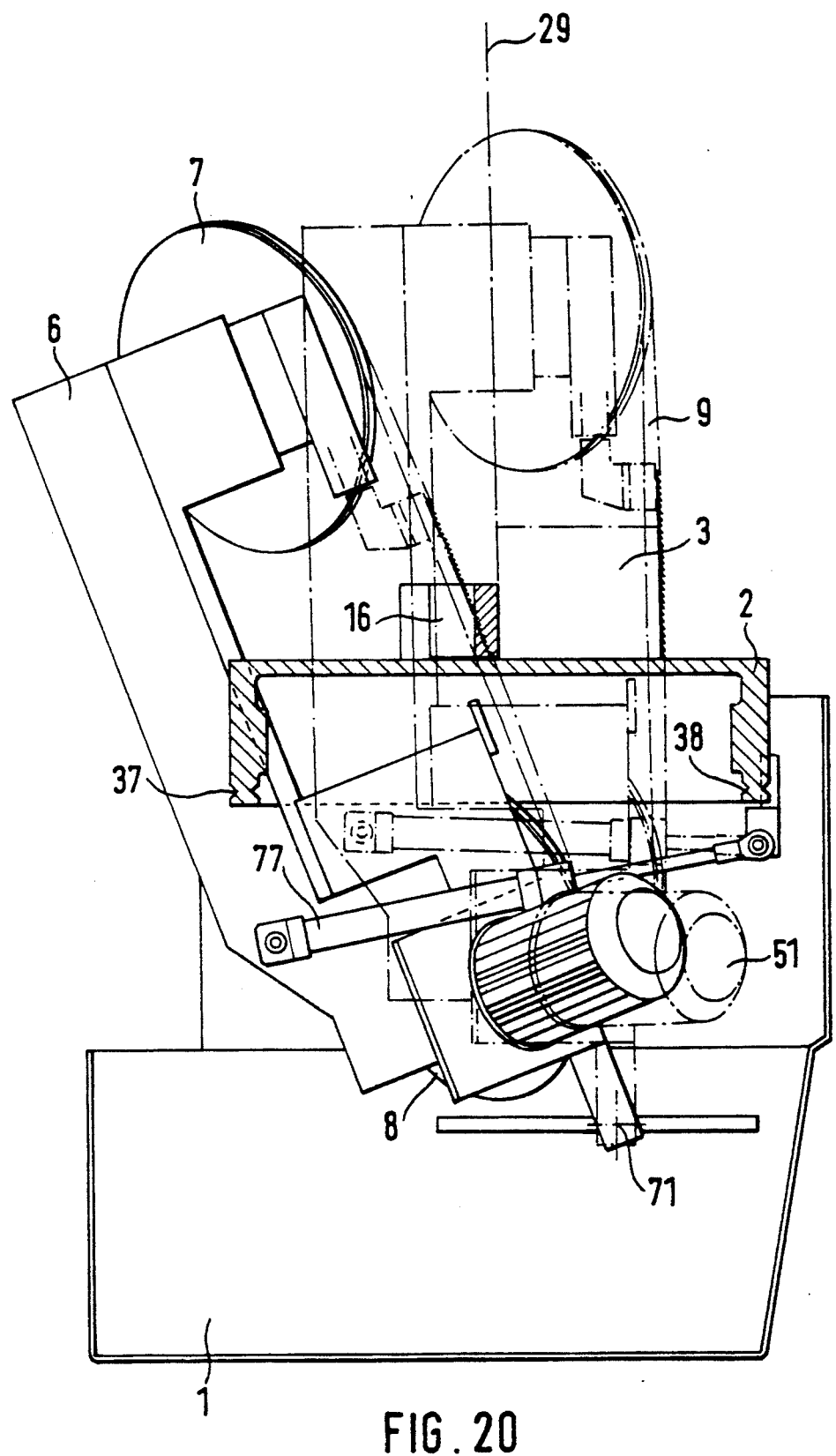

In order to couter these things, the measures according to the modified form of construction according to FIGS. 18 to 20 are provided.

Here again the wheel carrier 6 is mounted pivotably with its lower end on a shaft 70, about a spindle 71, the shaft 70 being horizontally displaceable by means of guide blocks 72, 73 in support means 74 which in turn are attached in a manner not illustrated in detail on the underside of the turntable 2.

The spindle 71 again lies transversely of the actual cutting plane defined by the saw band 9. The shifting of the blocks 72, 73 is effected by setting spindles 75, 76, which are rotatably mounted and drivable in rotation in the machine frame 1 in a manner not illustrated in detail.

As may be seen from FIGS. 19 and 20, with the aid of the setting spindles 75, 76 it is possible to set such foot points of the wheel carrier 6 that the saw band 9 stands vertically at the end of the cutting action.

Here FIG. 19 shows an example for a partial cut, that is, a cutting action in which the workpiece 3 is only partially cut through. On the other hand, FIG. 20 shows the case where the saw band in its vertical position has just cut through the workpiece 3.

Incidentally, the constructional limiting conditions as already explained with reference to FIGS. 1 to 4, and here are indicated again by the use of the reference numbering of FIGS. 1 to 4 which are also valid for the construction according to FIGS. 18 to 20.

The feed of the wheel carrier 6 takes place again in the embodiment according to FIGS. 18 to 20 by a piston-and-cylinder unit 77 pivotably articulated to the machine part in the form of the turntable 2 and also to the wheel carrier 6.

Figure 21:
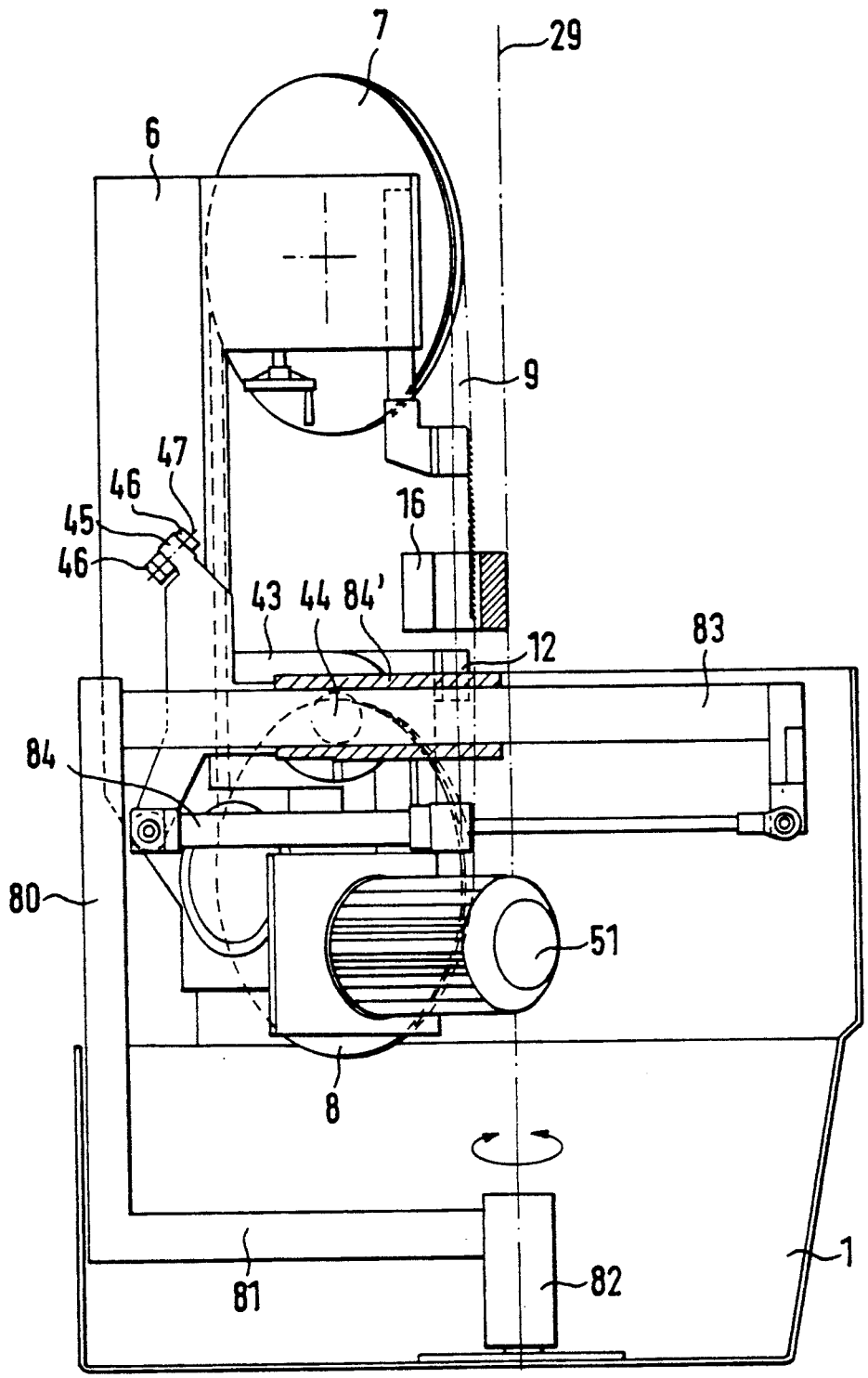
FIG. 21 shows a further constructive modification of the vertical band saw in cut-away lateral illustration after the manner of FIG. 8.

While in the preceding embodiments the availability of the wheel carrier 6 about the vertical axis 29 was always represented by means of a machine part in the form of a turntable 22 mounted rotatably on the machine frame 1, various other possibilities also exist for this purpose. FIG. 21 shows one of these possibilities. There the machine part is formed as a substantially C-shaped frame 80 the free end of the lower leg 81 of which is rotatably journalled relative to the spindle 29 by means of a pivot bearing 82 on the machine frame 1.

On its upper horizontal leg 83 the wheel carrier 6 is guided for displacement by means of a sleeve 84' fitted on the wheel carrier 6, and this displacement guidance can be made substantially as explained already in detail with reference to FIGS. 5 to 8, including the additional tiltability of the wheel carrier 6 about an axis 44 by means of the division of the guide part 33 by the part 43 mounted on it rotatably about the axis 44, while the tilting movement can be effected by the setting device 45 by means of the setting spindle 47.

In the case of FIG. 21 the feed movement of the wheel carrier 6 is effected by means of a piston-and-cylinder unit 84 which is pivotably articulated on the free end of the upper leg 83 of the C-shaped frame 80 and also on the wheel carrier 6.

As may be seen, the embodiment according to FIG. 21 forms an example according to which the workpiece material (not shown) can be supported for example only by guide tracks 4, 5 represented in FIG. 1, so that it is free in the region of the machine frame 1.

Finally, FIG. 22 again shows, in greatly simplified form, a variant of the subject-matter of FIG. 21 differing in that in the feed direction of the wheel carrier 6 or saw band 9 the upper leg 83' of the C-shaped frame 80 has a downwardly directed inclination by which the feed motion work in the direction towards the workpiece can be supported by means of a certain gravity component. Otherwise, the explanations of the other Figures and especially of FIG. 21 are valid for the embodiment according to FIG. 22.

Regarding all vertical band saw illustrated in FIGS. 1 to 22 it is to be especially pointed out that in the region before the abutment bridge 16, i.e. essentially in the region before the wheel carrier when in its retracted position, the region for the material to be worked is completely free, that is, no machine parts of any kind are in the way, which is of special importance for the repeatedly discussed freehand sawing. As regards the machine frame 1 this, as may be seen especially from the illustration in FIG. 2, is favorably formed for an operator so that the latter may work without difficulty come very close to the machine frame and approach the workpiece material to be worked, without hindrance.

Figure 22:
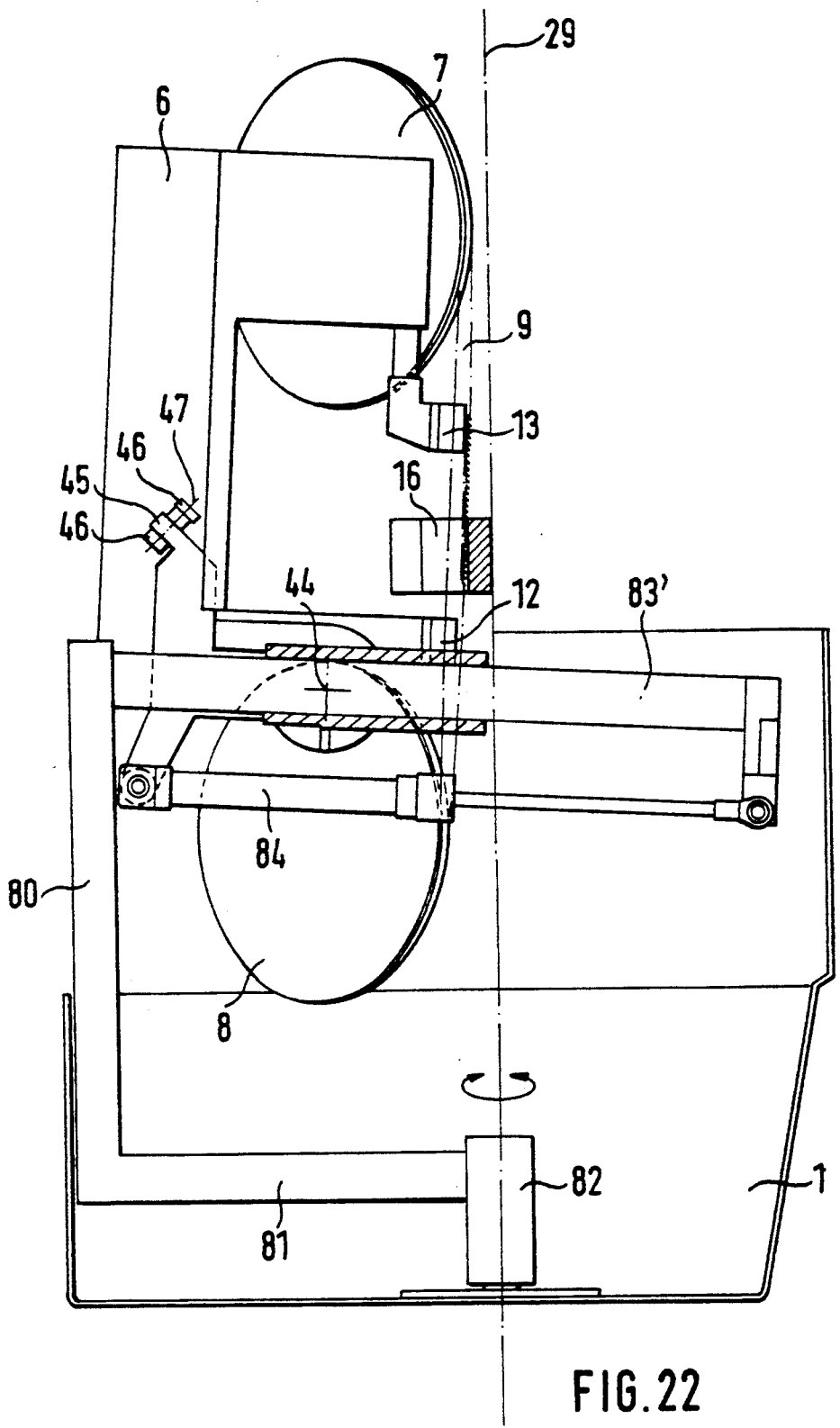
FIG. 22 shows a further variant of the machine according to the form of construction as shown in FIG. 21.

With reference to the embodiments according to FIGS. 21 and 22 it was especially indicated that here work is performed without a turntable or other component forming a machine bench. This can be very expedient for special cases, as then the chips occurring in sawing and other dirt and waste pieces can fall down unhindered into the machine frame 1. As special application cases mention should be made here of the cutting of long material sections, for example profiled portions, in combination with material guidance over roller tracks.

We claim:

1. A vertical band saw having
a frame (1);
a workpiece support (2) defining a support plane for supporting a workpiece (3);
an endless saw band (9), said saw band intersecting the support plane and defining a cutting plane (11);
a pair of saw band wheels (7, 8) respectively located above and below said workpiece support plane (2) and operable about respective axes of rotation, which axes of rotation are located in a respective horizontal plane and intersect said cutting plane (11) at an angle of up to 90°;
a saw band wheel carrier (6) supporting said saw band wheels in position;
guide means (12,13), coupled to said saw band wheel carrier (6), guiding the saw band (9) into a desired cutting plane, and
feed means for advancing the wheel carrier (6) in a direction towards the workpiece (3), and thus in a cutting direction (24);
whereby, when one of the saw band (9) and the workpiece (3) moves horizontally with respect to the other, the saw band engages the workpiece at an initial cutting position and then cuts into the workpiece,
wherein,
in order to permit miter cuts into the workpiece starting from said initial cutting position, said saw band carrier (6) is pivotable about a substantially vertical axis of rotation (29) which is fixed relative to the frame and which, at the instant cutting begins, coincides with said initial cutting position; and
means (28) are provided to lock the saw band carrier (6) in selected pivoted positions.

2. A vertical band saw according to claim 1,
wherein
said saw band, during each cutting operation, defines a cutting stretch having a starting point and an ending point in said workpiece, and
the axis of rotation (29) is parallel to and coincident with said cutting stretch.

3. A vertical band saw according to claim 1,
wherein the workpiece support (2) for the material (3) to be sawn includes, on a side of the material facing the wheel carrier (6) and on at least one side of the cutting plane (11) defined by the saw band (9), a stationary abutment bridge (16) having a substantially vertical clamping face (20) for the material of said workpiece (3).

4. A vertical band saw according to claim 3,
wherein
the axis of rotation of the wheel carrier (6) is aligned with the plane of the clamping face (20).

5. A vertical band saw according to claim 3,
wherein
at least one openable and closable clamping jaw (19) is arranged opposite to the abutment bridge (16), which jaw clamps the material (3) against the clamping face and likewise includes a substantially vertical clamping face (21).

6. A vertical band saw according to claim 5, wherein
in the direction of running of the saw band (9) and extending away from the saw band, the clamping face (21') is inclined in relation to the vertical.

7. A vertical band saw according to claim 6, wherein
on the side facing the saw band (9), the clamping jaw (19) comprises an optionally replaceable material to facilitate incision by the saw band.

8. A vertical band saw according to claim 3, wherein
at least one openable and closable clamping jaw (55) is provided in association with the abutment bridge (16) and beside the cutting plane (11) for clamping the workpiece (3) vertically against said workpiece support (2).

9. A vertical band saw according to claim 1, wherein
at least two saw band guide means, arranged respectively above and below said workpiece, are provided, and
the saw band guide means (12) arranged beneath the workpiece is secured to the wheel carrier (6) and the saw band guide means (13) arranged above the workpiece is made adjustable and securable on the wheel carrier in the running direction of the saw band (9).

10. A vertical band saw according to claim 1, wherein
the wheel carrier (6) is displaceable in the cutting direction (24) along a substantially horizontally extending guide (31, 33-35, 83, 83') which is pivotable and securable about the vertical axis of rotation (29).

11. A vertical band saw according to claim 10, wherein
the horizontal tilt axis is arranged on a machine part (2, 80) pivotable, on the machine frame, about the vertical axis of rotation (29).

12. A vertical band saw according to claim 11, wherein
a turntable (2) is provided as part of said workpiece support.

13. A vertical band saw according to claim 12, wherein
starting from the center of rotation (29) and in the feed direction (24) of the saw band (9), the turntable (2) has a notch (30) which accomodates passage of the saw band.

14. A vertical saw band according to claim 12, wherein
starting from its center of rotation in the direction towards the wheel carrier (6), the turntable (2) includes a substantially quarter-circular aperture (25) for the reception of:
the wheel carrier and any parts connected, in the plane of the turntable, with the wheel carrier, said aperture serving also to leave free a movement space of the wheel carrier between its two extreme feed positions free.

15. A vertical band saw according to claim 11, wherein
the turntable (2) is rotatably mounted on the machine frame (1).

16. A vertical band saw according to claim 15, wherein
the machine frame or turntable (2) includes a downwardly extending, right-cylindrical extension piece (32), in that the extension piece has a horizontal peripheral guide groove (37, 38) at its lower end, and
guide rollers (39, 40'), mounted rotatably about vertical axes on the machine frame (1), are in engagement with the guide groove.

17. A vertical band saw according to claim 11 wherein
the machine part or turntable (2) is rotatably mounted adjacent a foot portion of the machine frame (1).

18. A vertical band saw according to claim 17, wherein
the machine part or turntable (2) are connected through vertical support means (32') with a horizontal footplate (40), and in that the footplate is rotatably mounted on the machine frame (1) through a radial-axial bearing (41).

19. A vertical band saw according to claim 10, wherein
the horizontal guide of the wheel carrier (6) consists of a guide bar (31) which is surrounded by a corresponding guide part (33) of the wheel carrier, and of a tilt guide (35), arranged adjacently parallel to the guide bar, into which an end of a support arm (34), issuing from the guide part of the wheel carrier, displaceably engages.

20. A vertical band saw according to claim 19, wherein
the guide bar (31) has a substantially circular cross-section.

21. A vertical band saw according to claim 1, wherein
the wheel carrier (6) is pivotable in the cutting direction about a tilt axis (66, 71) which is pivotable and securable about the vertical axis of rotation (29) and which is arranged horizontally and substantially transversely to the cutting direction (24).

22. A vertical band saw according to claim 10, wherein
at least one stop (42) for the movement limitation is arranged parallel to the horizontal guide on the machine part (2).

23. A vertical band saw according to claim 22, wherein
the stop (42) is adjustable by a setting spindle (60) mounted rotatably on the machine part (2), and in that detent noses (62) firmly connected at least indirectly with the wheel carrier (6) (guide part 33) co-operate with the stop.

24. A vertical band saw according to claim 10, wherein
the wheel carrier (6) is tiltable in relation to its horizontal guide about a substantially horizontal axis (44) placed transversely of the cutting plane (11), and is securable in any desired tilt orientation.

25. A vertical band saw according to claim 24, wherein
the tilt axis (44) of the wheel carrier (6) is arranged in the region of the middle between the two vertical runs of the saw band (9).

26. A vertical band saw according to claim 24, wherein
the wheel carrier (6) is tiltably or pivotably articulated to its guide part (33) co-operating with the longitudinal guide, and is securable in any desired tilt orientation.

27. A vertical band saw according to claim 26, wherein a setting device (45), inserted between said wheel carrier and said guide part (33), is provided for setting and securing of the wheel carrier (6) in any desired tilt orientation.

28. A vertical band saw according to claim 27, wherein the setting device is a setting spindle (47).

29. A vertical band saw according to claim 21, wherein the tilt axis (71) is guided in the cutting direction of the saw band (9) substantially horizontally adjustably and displaceably.

30. A vertical band saw according to claim 29, wherein adjustment of the tilt axis (71) is effectable by at least one setting spindle (75, 76) which is mounted rotatably but axially non-displaceably on the machine frame (2).

31. A vertical band saw according to claim 1, wherein the feed means are articulated pivotably both with respect to the machine part (2, 80) and to the wheel carrier (6).

32. A vertical band saw according to claim 31, wherein the feed means comprise at least one of: a hydraulic piston-and-cylinder unit (36, 67, 77, 84) and a setting spindle.

33. A vertical band saw according to claim 1, wherein an operating arm (49) is arranged on the machine frame (1), said arm protruding into the region of movement of an edge or face of the wheel carrier (6), for the limitation of the feed movement of the wheel carrier, and the operating arm is adjustable with regard to the feed value of the wheel carrier, as a function of workpiece cross-section.

34. A vertical band saw according to claim 33, wherein the operating arm (49) is arranged in the machine frame (1) beneath the support (2) for the workpiece (3) to be sawn, co-operating with a front edge or face of the wheel carrier (6).

35. A vertical band saw according to claim 1, wherein the wheel carrier is securable in its foremost feed position with respect to the cutting direction (24).

36. A vertical band saw having a frame (1);

a workpiece support (2) defining a support plane for supporting a workpiece (3);

an endless saw band (9), said saw band intersecting the support plane and defining a cutting plane (11);

a pair of saw band wheels (7, 8) respectively located above and below said workpiece support plane (2) and operable about respective axes of rotation, which axes of rotation are located in a respective horizontal plane and intersect said cutting plane (11) at an angle of up to 90°;

a saw band wheel carrier (6) supporting said saw band wheels in position;

guide means (12, 13), coupled to said saw band wheel carrier (6), guiding the saw band (9) into a desired cutting plane, and feed means for advancing the wheel carrier (6) in a direction towards the workpiece (3), and thus in a cutting direction (24);

whereby, when one of the saw band (9) and the workpiece (3) moves horizontally with respect to the other, the saw band engages the workpiece at an initial cutting position and then cuts through the workpiece to a predetermined exit cutting position, wherein, in order to permit miter cuts into the workpiece starting from said initial cutting position, said saw band carrier (6) is pivotable about a substantially vertical axis of rotation (29) which is fixed relative to the frame and which, at the instant cutting begins, coincides with said predetermined exit cutting position; and means (28) are provided to lock the saw band carrier (6) in selected pivoted positions.

* * * * *